(12) United States Patent
Gurin

(10) Patent No.: US 11,605,975 B1
(45) Date of Patent: Mar. 14, 2023

(54) DYNAMIC SYSTEMS LEVERAGING DECOUPLED WIRELESS POWER WITH INTEGRAL ENERGY STORAGE

(71) Applicant: Michael Gurin, Glenview, IL (US)

(72) Inventor: Michael Gurin, Glenview, IL (US)

(73) Assignee: Michael Gurin, Glenview, IL (US)

( * ) Notice: Subject to any disclaimer, the term of this patent is extended or adjusted under 35 U.S.C. 154(b) by 214 days.

(21) Appl. No.: 17/098,430

(22) Filed: Nov. 15, 2020

Related U.S. Application Data

(63) Continuation-in-part of application No. 16/398,264, filed on Apr. 30, 2019, now Pat. No. 11,011,909.

(60) Provisional application No. 62/936,401, filed on Nov. 16, 2019.

(51) Int. Cl.
| | |
|---|---|
| *H02J 50/05* | (2016.01) |
| *H02J 50/30* | (2016.01) |
| *H02J 50/80* | (2016.01) |
| *H02J 50/00* | (2016.01) |
| *H02J 7/00* | (2006.01) |

(52) U.S. Cl.
CPC ........ *H02J 50/005* (2020.01); *H02J 7/00045* (2020.01); *H02J 50/30* (2016.02); *H02J 50/80* (2016.02); *H02J 2300/24* (2020.01)

(58) Field of Classification Search
CPC ...... H02J 50/005; H02J 7/00045; H02J 50/30; H02J 50/80; H02J 2300/24
USPC ......................................................... 700/291
See application file for complete search history.

(56) References Cited

U.S. PATENT DOCUMENTS

| | | | | |
|---|---|---|---|---|
| 2004/0233055 | A1* | 11/2004 | Canich ................. | G08B 25/004 340/539.26 |
| 2007/0152816 | A1* | 7/2007 | Koste .................... | G08B 13/08 340/545.3 |

\* cited by examiner

*Primary Examiner* — Michael J Brown

(57) ABSTRACT

A system and method for wireless power energy distribution in which power is allocated for both real-time use as well as subsequent distributed energy storage including host objects that achieve enhanced features as enabled by the availability of wireless power. Embodiments range from stationary to mobile host objects such as reusable packaging system including direct impact on a transport vehicle moving a reusable container within a reusable packaging system.

10 Claims, 17 Drawing Sheets

Side View - Scenario A

Side View - Scenario B

Top View - Scenario A

Top View - Scenario B

Side View - Scenario C

Side View - Scenario D

Top View - Scenario E

Top View - Scenario A

Top View - Scenario B

Top View - Scenario C

Top View - Scenario D

Top View - Scenario A

Top View - Scenario B

Side View - Scenario C

Side View - Scenario D

Top View - Scenario A

Top View - Scenario B

DYNAMIC SYSTEMS LEVERAGING DECOUPLED WIRELESS POWER WITH INTEGRAL ENERGY STORAGE

CROSS-REFERENCE TO RELATED APPLICATIONS

This patent application claims priority from U.S. Provisional Patent Application No. 62/936,401 titled "Dynamic Systems Leveraging Decoupled Wireless Power with Integral Energy Storage" on Nov. 16, 2019, the content of which is incorporated by reference, and also patent application claims priority from U.S. patent application Ser. No. 16/398,264 titled "Feedforward Dynamic and Distributed Energy Storage System" on Apr. 30, 2019, the content of which is incorporated by reference.

FIELD OF INVENTION

The present invention relates to an electricity energy storage system, co-located with its energy consumer, receiving its energy (also referred to as power) from a wireless power transmitter preferably with coordinated charging and discharging via a control system through at least energy flow pathways to minimize system installed cost. The implementation of the inventive system is of particular importance in dynamically reconfigured spaces, reconfigurable spaces and non-capital assets ranging from stationary to portable objects within those spaces including further personal objects used in a powered environment whether that environment be indoors or outdoors.

BACKGROUND OF INVENTION

Wireless power systems, as known in the art, are all about removing the need for cables/wires for charging of devices having on-board batteries or even eliminating the need for batteries completely with the predominant objective of either reducing physical space due to an otherwise larger battery to ensure power supply for a rated period of time and certainly eliminating the inconvenience of changing batteries at the end of its operating lifetime (or in many instances reducing the frequency of replacement). In a very limited way, if any, does wireless power change the primary functionality or design of the power device. Furthermore, notably long-distance wireless power (meaning a range of greater than 1 foot and in many instances greater than 10 feet) have insufficient power to meet the peak power requirements of the host (or also referred to as controlled device). The insufficiencies therefore require substantial design ramifications for the controlled device(s) in order to meet operational requirements despite those insufficiencies.

Prior art includes the stationary placement of energy storage system(s) within a utility electric grid or within buildings for decoupling power generation from power consumption, such as in particular the creation of intermittent renewable energy (e.g., solar, wind) producers. The integration of particularly solar panels into buildings of all types are done solely in an incremental manner along with the energy storage system. This method has minimal impact in reducing the costs of total building systems, in fact in all cases the total building system cost is higher with the energy storage system than without it.

Other prior art includes solely distributed stationary energy storage systems in which the charging and discharging takes place at the same location and therefore solely realizes the time differential between peak and off-peak rate structures without having any secondary benefits or increase in utilization factors. In fact, this scenario doesn't even bypass the distribution lines of the traditional energy distribution components therefore leading predominantly to a traditional once a day peak to off-peak offset.

Advances in technology have changed the way construction has taken place, such as a shift to modular and prefabricated assembly though it is almost exclusively structural in nature. However, the design of buildings has not changed substantially to truly leverage and take advantage of energy distribution advances such as advance energy storage, wireless power, and other advance materials and solid-state electronics capabilities. Therefore, modular construction has only incrementally reduced the cost of construction and systems leveraging the new technologies actually increase the capital cost of the total system solution rather than reduce capital costs.

Needs in use of physical space has also changed particularly around the dynamic and reconfigurable use of physical space though it has not yet taken into account the availability of long-range wireless power that is currently severely limited in terms of amount of power capable of being transmitted such that it often exceeds the peak power requirements of connected energy consumers receiving the wireless power. Furthermore, the concerns of electromagnetic and/or radio-frequency exposure on occupants (i.e., viewers, users) remain even at the currently approved low-power ratings (e.g., currently approximately less than 3 Watts, and anticipated to be on the order of 10 Watts).

A need for a distributed wireless power with energy storage system that greatly enhances load-balancing while reducing system installed capital costs and maximizing reconfigurable space alternatives. Further a need exists to design around the shortcomings of wireless power, while leveraging features uniquely enabled by wireless power.

SUMMARY OF INVENTION

The present invention is a distributed and decoupled energy storage system from a power generating source, whether that source be from a centralized grid or a micro-grid, such that an electricity consumer with integral electricity storage obtains power asynchronously from the power generating source and at least in part through a wireless power transmitter so as to overcome the operating deficiencies of wireless power.

A primary object of the invention is to operate the electricity consumer at a power rating above the limited capacity of the wireless power infrastructure.

Another object of the invention is to reduce the size of an integral electricity storage, particularly when the electricity consumer is mobile or reconfigurable within an operating environment.

Yet another object of the invention is leveraging a feedforward wireless power transmission controller concurrently with a feedback energy regulator of the electricity consumer to leverage the electricity storage and wireless power infrastructure.

Another object of the invention is to minimize any changes of center of gravity within the electricity consumer by leveraging non-electrical energy spreading within the electricity consumer for both energy conversion efficiency, safety, and higher mass density in close proximity to the center of gravity.

Yet another object of the invention to increase comfort of host/personnel equipped with the wireless power enabled electricity consumer.

Another object of the invention leverages the non-electrical energy spreading to minimize the time associated with cleaning of the host in which the electricity consumer is placed.

Yet another object of the invention leverages the non-electrical energy spreading to minimize the incremental cost of the host in which the electricity consumer is placed, particularly when more than one host is owned though used at different times.

Another object of the invention is to gain numerous features uniquely enabled by leveraging wireless power even when the electricity rating substantially exceeds the peak rating of the electricity consumer.

Yet another object of the invention is to maximize the performance of the host in which the electricity consumer is placed within.

All of the aforementioned features of the invention fundamentally recognize the distinction of a decoupled energy storage system that leverages the gains realized by integrating in a decentralized manner and providing multiple concurrent supplies of energy to energy consumers especially within buildings leveraging modular construction designs.

DEFINITIONS

Figure 1:
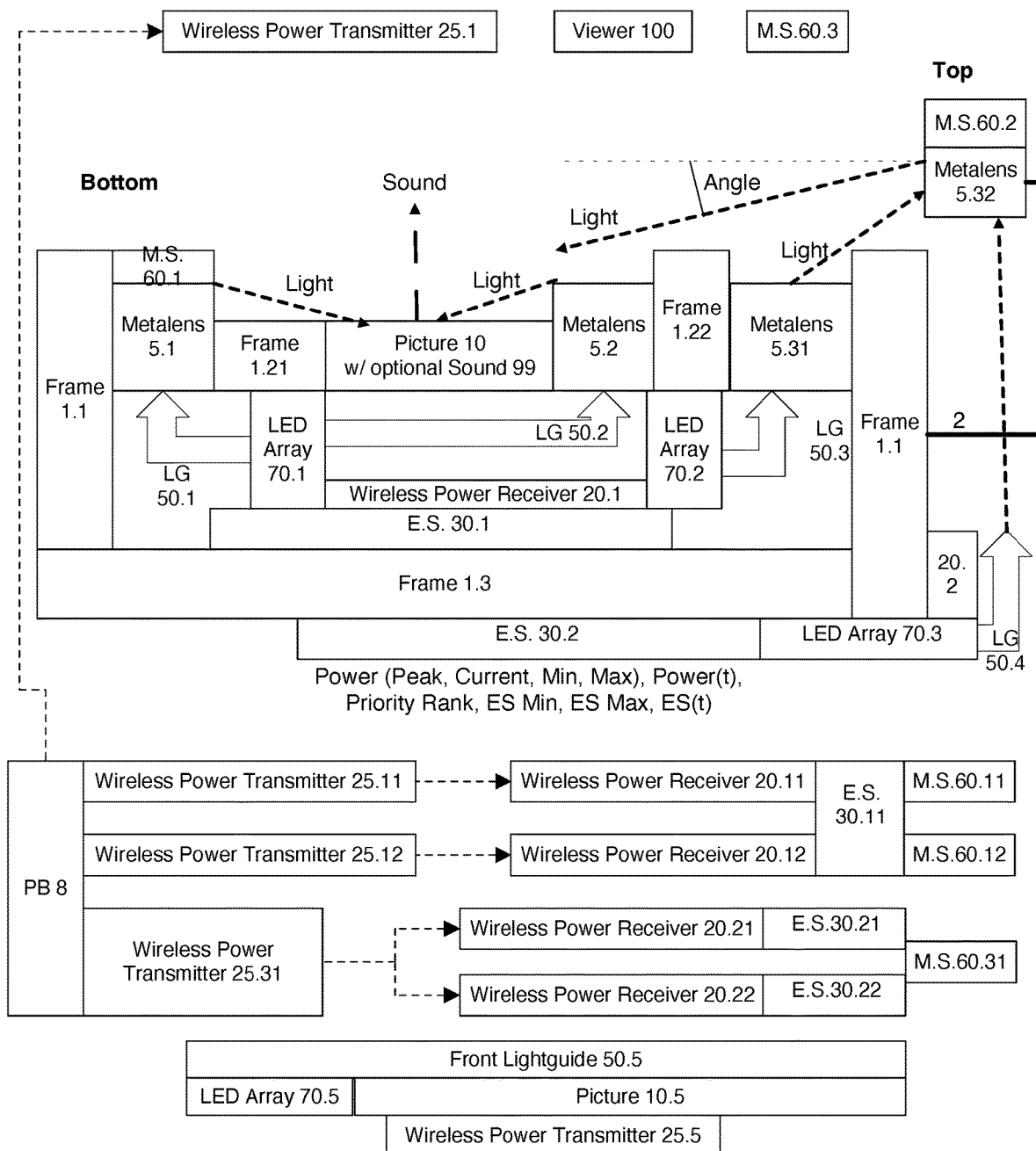
FIG. 1 is a side view of the wireless power system with integral energy spreader and energy storage embodied as a picture frame.

The term "energy storage" is a material that stores energy, whether it be thermal or electrical, such that the primary production of the stored energy form "primary energy" is directed into the energy storage via charging and is subsequently at a non-concurrent time discharged for ultimate end-use consumption of the stored energy subsequent. The transferring of the primary energy as stored energy (i.e., charged media) from the energy storage location to another device to decouple the ultimate consumption of the primary energy at a second location occurs at a "repowering station" hereinafter also abbreviated as "RS". When the energy storage is in the form of electricity, hereinafter also called "electricity storage", it takes the form of a battery, a capacitor, ultra-capacitor or other known means in the art.

The term "feedforward and feedback loop control system" is the combination of controlling components (i.e., energy storage components and energy distribution lines) first using a feedforward control system immediately followed by a feedback control system such that control parameters of the feedback control system are a function of the feedforward control system. For clarity, it is understood that the term control system is at least a feedback loop control system and preferably a feedforward and feedback loop control system.

The term "comfort" is the combination of temperature and humidity, as known in the art of air conditioning and/or heating, impact on occupants within a physical space. In the context of this invention, the physical space is replaced by a controlled sub-climate immediately encompassing the occupant creating a "controlled interior space" or also referred to as "interior space".

The term "interior space" is synonymously used with "personal environment" "personal space" and "personal climate" all meaning the micro-climate in which the occupant feels with the goal of maximizing the micro-climate from the broader climate within the physical space that the occupant occupies.

The term "energy spreader" is a pathway in which energy, whether that energy includes mechanical energy potential (e.g., air flow), optical energy (e.g., light), or thermal energy (e.g., thermal transport through conductivity).

The term "secure space" is a physical space in which obstruction by a non-desired object can't obtain physical access within the space in order to prevent a successful transfer of an object of value being transported. A secure logistics vehicle limits physical access to cargo via reusable packaging that itself provides secure (therefore limited access) to the cargo being transported.

The term "non-secure space" is a physical space in which obstruction by a non-desired object can't be prevented for physical access within or around the space therefore there is no method to prevent a successful transfer of an object of value being transported (i.e., stealing, damaging, etc.).

The term "wireless power" is any means of transporting energy without using cables or guides that constrain the transport of the energy (except to any degree directional flow or control is regulated). Wireless power is specifically desirous to move energy from a first location to a second location without any physical obstruction between the first and second locations. Such forms of wireless power include radio frequency "RF" (e.g., Energous Corporation or Ossia) or light (whether that spectrum be in the visible or infrared) in which the transmitted light is converted into electricity by the wireless receiver.

The term "long-range wireless power", which in fact is the scope of the invention such that all references hereinafter refer to long-range wireless even when not explicitly stating so, is the transmission of power (whether it be RF field, optical, or any other non-wired solution) between at least one transmitter and at least one receiver when the distance between the transmitter and the receiver is greater than 1 foot and in most instances greater than 3 feet.

DETAILED DESCRIPTION OF INVENTION

Here, as well as elsewhere in the specification and claims, individual numerical values and/or individual range limits can be combined to form non-disclosed ranges.

Exemplary embodiments of the present invention are provided, which reference the contained figures. Such embodiments are merely exemplary in nature. Regarding the figures, like reference numerals refer to like parts.

The core invention is such that stationary applications have a ratio of energy storage discharge peak rating to wireless power "charging" peak rating between 100:1 and 5:1. The stationary applications in which the invention is both best suited as well as uniquely enabling are intermittent applications (at least where operating time is less than 70% of the "charging time" and more preferred where operating time is less than 50% of the "charging time" and operating at peak power is less than 30% of the "charging time") where the peak power rating is substantially greater than the wireless power rating. Whereas mobile applications (at least performance based such as sports activities and other weight-sensitive applications) have a preferred ratio of energy storage discharge peak rating to wireless power peak rating between 1:5 to 1:1000. In the instance of the stationary applications.

Turning to FIG. 1, FIG. 1 depicts an embodiment where the energy spreader is optical energy (in most cases visible light, though anticipated in other embodiments non-visible light particularly infrared for radiant heating) through a lightguide. This exemplary is a picture frame such as in an art gallery where the requirement for art display flexibility exists plus the need for wireless power in each picture frame to be greater than the capabilities of a given wireless transmitter/receiver on a real-time basis. In this instance a picture (whether it be an artistic work of art, a photo, or virtually any visual display) is in structural communication with at least one frame component directly or indirectly via additional multi-functional components that serve a primary purpose other than the secondary purpose of structural communication. It is understood, and in fact preferable in many instances such that the picture has integral (though optional) sound projection 99 that doesn't interfere with the viewing of the picture. The preferred sound projection 99 is directional in nature such that the sound is projected towards the viewer 100 and only in the intermittent instances in which the viewer is both within optimal viewing range of the picture and sound receiving range. In most instances the viewer benefits from additional light beyond the available ambient light and therefore the backside of the frame is utilized for energy spreading (in this instance lightguides 50.1, 50.2, 50.3, and 50.4 each being optional lightguides that can be used individually or in any combination) to project light respectively generated by an LED (preferentially an LED array that collimates light efficiently into the lightguide as known in the art) respectively 70.1, 70.1, 70.2, and 70.3. LED Array 70.1 provides light to both lightguides 50.1 and 50.2 and then further optically guided through metalens 5.1 and 5.2. The metalens 5.1 as depicted redirects the light effectively perpendicular to the picture into more parallel light from the bottom portion of the frame such that frame segment 1.1 serves as structural communication to extend the output of the light in the Z-plane (assuming the picture is in the X.Y planes) to engulf more of the picture preferably homogeneously throughout the entire picture (which incidentally requires the inventive placement of the metalens to achieve) and to also shield the viewer from objectionable direct viewing of the intense collimated light output. The use of metalens 5.1 is particularly suited when the viewer line of sight is below the bottom portion of the picture frame 1.1. Frame segment 1.21 provides further structural communication and additional optical shielding. The same LED array 70.1 (though understood that the placement of the LED array to the lightguide and ultimately to the metalens relative to the picture and to the frame can be in virtually any combination or follow any optical pathway in so far as the majority of the lightguide pathway remains behind the picture except in the instance of lightguide 50.4) also services lightguide 50.2 for light through metalens 5.2 such that the function is identical to metalens 5.1 except for the optical output being at the top of the frame so that the viewer having a line of sight above the picture 10 has the same light shielding benefits for this orientation. It is understood that the orientation of top and bottom can be replaced by left and right, and furthermore it is anticipated that any combination of top, bottom, left and right can be utilized. A primary function of the invention is such that light is provided on the picture when the viewer (or also sometimes referred to as the occupant) is present. As such the integration of the motion sensor 60.1 is advantageous to take advantage of the locally available electrical energy to power the motion sensor. The particularly preferred motion sensors also utilize a metalens such that it becomes practically invisible to the viewer and also to any occupant within the physical space (i.e., room) in which the picture is located. Depending on the mechanism of action for the motion sensor it can optionally be placed behind the picture in the instances in which the mechanism to determine presence is relatively transparent or at least translucent to the substrate of the picture. It is understood that the motion sensor, such as motion sensor 60.3 can be placed anywhere in the same physical space and in communications with the microprocessor regulating the energy spreading (in this instance LED Arrays and respectively lightguides). Another instance, particularly when the frame dimensions do not provide sufficient space in the Z direction is such that lightguide 50.4 and its respective metalens 5.32 are exterior to the frame 1.1 such that the energy spread (light) is projected to the metalens 5.32 that is in structural communications with the frame 1.1 through a structural element 2

(that also doubles as electrical wire to the motion sensor and receiving motion sensor signal for communications to the picture frame collectively referred to as the controlled device microprocessor) but at a spacing greater than the Z dimension of the frame itself so as to increase the relative angle of the light emitted onto the picture 10 as can be achieved by a metalens integral to the frame itself. Motion sensor 60.2 achieves superior performance by having an obstructed view into the physical space at a better angle of orientation into that same space. In FIG. 1 the light being emitted is represented by dashed lines in the approximate angle and orientation as shown. The placement of the wireless power transmitter 25.1 can be virtually anywhere in the physical space, though given that an optimal space for the wireless power receiver 20.1 is behind the picture so as to not create any visual appearance, it is best located in front the picture. Another instance, particularly when the picture (or any controlled device) is placed on a wall having traditional electrical wires the placement of wireless power receiver 20.2 benefits when the wireless power transmitter is highly directional and collimated in its wireless power projection. When the wireless power is optical, the wireless power transmitter (though not depicted) would benefit from the use of an LED array and a lightguide to highly collimate the light to the wireless power receiver. In all instances the wireless power receiver 20.1 is in structural communications, whether it be directly to a frame segment or indirectly via another component that is then subsequently in structural communications with a different frame segment. The wireless power receiver 20.1 is always in electrical communications with the energy storage 30.1 device (e.g., battery, capacitor, ultracapacitor) so as to decouple the receiving of electrical energy through the wireless power receiver from the usage of such electrical energy whether the electrical energy in this instance is used for powering the motion sensor, the LED arrays, or the sound 99 projection device. The energy storage device 30.1 can be effectively hidden by placement behind the picture 10 and in front of a back structural frame segment 1.3, or alternatively behind the frame segment 1.3 as depicted for energy storage 30.2 device when the energy storage device feeds electrical energy to an entirely external LED array 70.3 (having the advantage of superior thermal management by convection air flow) such that emitted light is collimated into lightguide 50.4 and then directed to metalens 5.32 (though it is understood that in each reference to metalens it can be substituted as known in the art to include reflective surfaces). In this instance, the wireless structural frame system can optionally be in structural communications with a bracket to hold a light receiver, shown here as the metalens 5.32, such that the light coming out of lightguide 50.4 is in optical communications through the aft then with a metalens light receiver that can be any non-linear lens or reflector so as to increase the incoming angle of light onto the picture 10 at least 5 degrees greater than an incoming angle of light if the light discharge emanated from any of the frame segments notably the frame segment having the greatest distance away from the picture in the Z direction.

A further important aspect of the invention is such that a motion detector detects the presence of an occupant within the physical space in which the co-located energy storage system and wireless power receiver occupy and that the motion detector is in communications with both the wireless transmitter (whether that be indirectly via a wireless or wired communications method as known in the art) and the occupant presence turns on the device operating from the energy storage while concurrently disengaging the wireless transmitter such that the occupant is not exposed to the energy field (when RF) or optical beam (when light) for enhanced safety. The motion detector, preferentially as known in the art, also provides the inventive system a relative position of the occupant with the controlled device such that the controlled device communicates information from at least one motion sensor/detector and the resulting system calculates the viewing angle between the occupant and light source co-located with the controlled device such that emitted light from the controlled device (particularly when there are multiple light sources) is optimized to achieve a balance of light output onto the desired subject (in the instance of FIG. 1 being the picture/photo) that includes reducing the light output (by at least 5%, preferably at least 50%) where the occupant sees the light source (which includes the optical device in which light emanates from when the light is transmitted through a lightguide. It is understood that the motion detector (i.e., motion sensor) is either integral to the frame of the controlled device, is remote yet within the physical space in which the controlled device occupies such as when utilized for an energy management or security application.

As noted earlier, the fundamental deficiency of insufficient power available to meet the peak power demands in real-time from the wireless power transmitter(s) through the wireless power receiver integral to the powered and controlled device, hereinafter generically referred to as "controlled device". The inventive feedforward control system is a key element to physical design changes including component integration and systems integration. Extreme methods of achieving energy efficiency are demanded and in virtually all instances require unique integration features such that the controlled device places separate and distinct power draw demands from an energy storage device and wireless power receiver based on control parameters substantially beyond the real-time feedback control functions on the energy storage device and the wireless power receiver.

One such method is the novel integration of a lightguide void of any electrically conductive coating or film so as to ensure RF transparency through the lightguide and also through the photo/picture. The particularly preferred lightguide is a front lighting lightguide that presents higher efficiency, thinner lightguides for better energy transmission, and such that the photo-picture in combination becomes the substrate for the wireless power transmitter (or receiver). An LED array on the perimeter of the photo/picture can provide backlighting or front lighting 50.5 as shown with the light source from LED array 70.5 (meaning light comes from the front instead of the back, which requires the picture/photo to at least be translucent if not entirely transparent) directly onto picture instead of lightguide emitting light from the side and perpendicular to the picture. In FIG. 1 (at the bottom) LED array 70.5 as powered in any manner possible (wireless receiver or even wired solution) such that the picture can be utilized to hide a wireless power transmitter. It is understood that this portion of the figure is to depict individually the hiding of the wireless power transmitter and also the front lighting. The lightguide 50.5 all of which provides light onto the picture 10.5, and of which the wireless power transmitter 25.5 is in structural communication with the picture 10.5. Another embodiment further integrates an optional optical, electrical and RF transparent directional sound emitter (either in front of the picture, or behind the picture when the picture is at least 5% porous substrate). It is also understood that the depiction of the picture in FIG. 1 can be directly replaced by solely directional sound emitter (as it has the same fundamental problem of a mismatch of maximum wireless power transmission when sound as light emitter) in which instance the inventive features are realized for a sound speaker and further preferentially a directional sound speaker. The utilization of the invention within directional sound speaker has the further advantage of reducing exposure of an occupant within the same physical space to the energy being transmitted wirelessly. Therefore, one embodiment of the invention is such that the occupant within the physical space is not within the wireless power transmission field by the positioning of the directional sound speaker with integral wireless power receiver also void of the occupant such that directional sound overcomes deficiencies of placing the speaker in an otherwise non-optimal position.

Yet another feature of the invention is such that the energy storage 30 "ES" is always in structural communication with the frame 1 and preferably is oriented to serve as weight ballast to provide structural stability of the wireless power receiver or transmitter system.

The transmission of power, in which the power can originate from a common power-bus 8, can have multiple configurations including: a) one wireless power transmitter 25.11 to a dedicated wireless power receiver 20.11 and a second wireless power transmitter 25.12 to another dedicated wireless power receiver 20.12 with both supplying power to a single energy storage device 30.11 with at least one or more motion sensors 60.11 and 60.12 providing an external indicating of activity to impact the operation of the controlled device. This configuration recognizes that wireless power to date, the fundamental motivation for the invention, has limited capacity to continuously provide power to the controlled device, therefore multiple pathways is one such way to overcome this deficiency. It is understood that the control logic for the motion sensor(s) is such that presence could be determined for either one or requires both.

Another embodiment is such that the wireless power transmitter 25.31 can intermittently provide power to two distinct controlled devices with the first receiving through the wireless power receiver 20.21 and the second receiving power through the wireless power receiver 20.22. Each wireless receiver provides power respectively to an individual energy storage device 30.21 and 30.22. In this embodiment with respect to the motion sensor, motion sensor 60.31 depicts how a single motion sensor can impact the control logic for two different controlled devices (which would likely use wireless data communications such Bluetooth Low Energy).

Multiple distinct types of controlled devices are enabled by the invention, including chairs (especially chairs with integral comfort control features that are energy intensive), personal and local air purifiers as well as comfort control, table or desk (large surface area also provides radiant energy), pathogen killing devices in which the killing mechanism requires a power source. Controlled devices such as chairs, tables, or reusable containers when nested for compactness have wireless power receivers in a pattern such that a first controlled device doesn't interfere with each of the other controlled devices from receiving the wireless power therefore remaining transparent to each successive controlled device.

Figure 2:
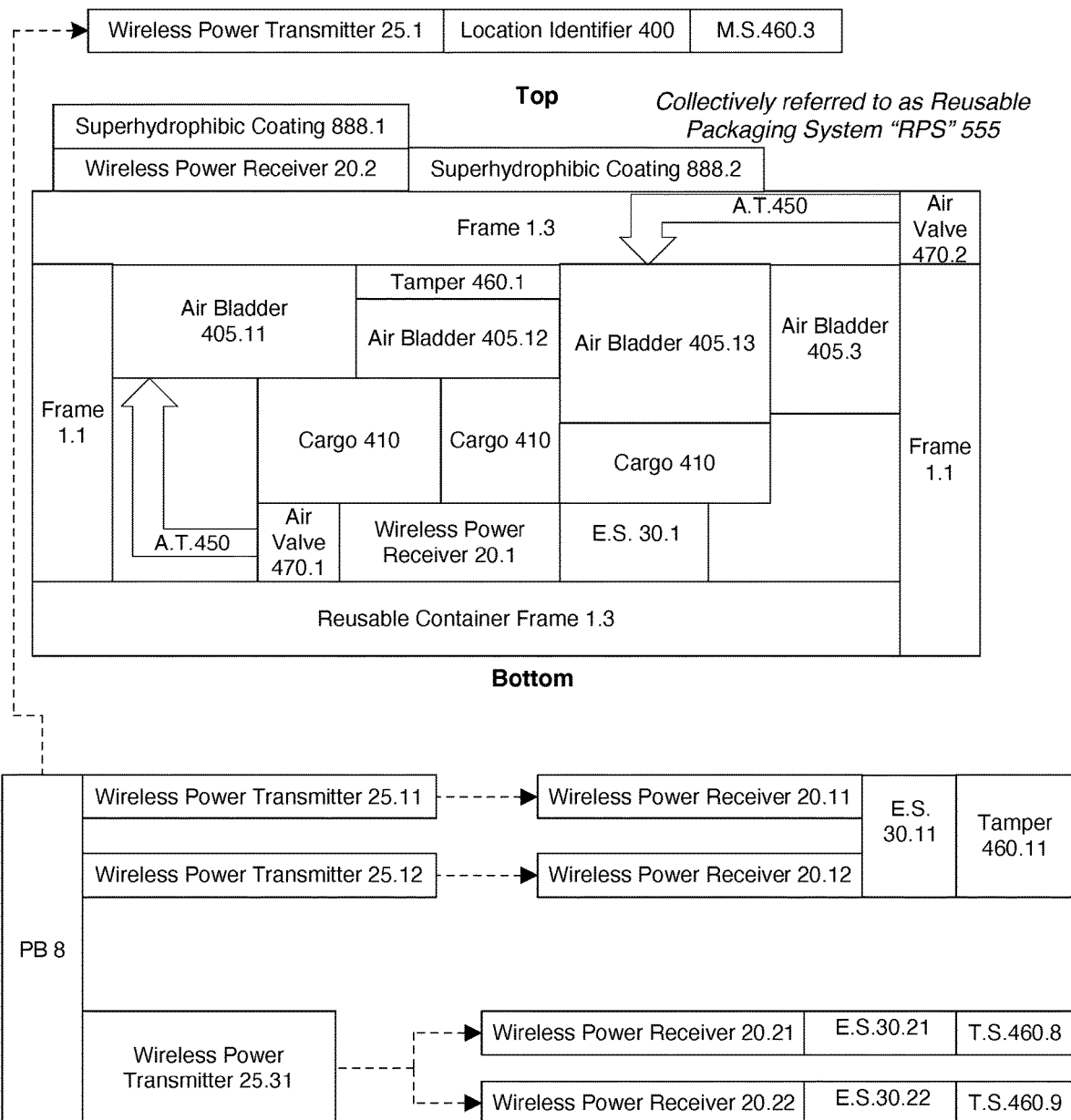
FIG. 2 is a side view of the wireless power system with integral energy spreader and energy storage embodied as a reusable packaging system.

Turning to FIG. 2, FIG. 2 depicts the invention instance in the embodiment of a Returnable Package System "RPS". Contrary to FIG. 1 that specifically shows a picture frame object in which the picture specifically but also the frame surrounding and supporting the picture requires energy that exceeds the ability of the wireless power transmitter to meet peak or real-time power requirements (such as for the directional lighting of FIG. 1), has a fundamental basis for the energy storage size to be minimized and to utilize the wireless power transmitter with the wireless power receiver to rapidly charge the onboard energy storage to meet very minimal energy requirements.

The RPS 555 in its preferred embodiment receives its power from a wireless power transmitter 25.1 along with communications to its embedded and onboard microprocessor/processor (3100, FIG. 4) of the location identifier 400 indicative of the current location or geofence in which the RPS is currently used. The location identifier 400 in the optimal embodiment is a part of the encryption method so as to ensure secure communications. The further inclusion of the motion sensor 460.3 is used to activate presence specific functions including the turning on of the wireless power transmitter. The motion sensor is a critical part of the tamper resistance verification of the system so as to ensure that the detection of motion external of the RPS establishes a time window in which a tamper 460.1 sensor is anticipated to be within when the opening of the RPS is legitimate. It is understood as known in the art that a security system could take a picture or turn on ambient lights (such that when the RPS wireless power receiver is a photovoltaic device) it ensures that adequate energy power is available for the microprocessor to register a tamper event through the tamper 460.1 sensor. Most instances in which the RPS could have tampering would be coincident with ample lighting.

The wireless power transmits power to the wireless power receiver, which when the receiver is photovoltaic by definition must be external facing of the RPS 555 therefore being wireless power receiver 20.2. When the receiver is through RF or electromagnetic means then the wireless power receiver can be internal of the RPS 555 as indicated by wireless power receiver 20.1. The RPS is sufficiently secure to contain the cargo 410 by preferably encapsulating the cargo 410 through a series of contiguous frames 1.3 in structural communications to removable frames 1.1. Though removable frames 1.1 are shown to be on the sides of RPS, it is understood that removable/disconnect able portion of the frame can be on the top, bottom, or any side of the RPS.

Another feature of the invention is to use energy spreading, which is preferably air at a pressure greater than ambient pressure, to concurrently provide damage resistance (i.e., cargo safety from breaking) and tamper resistance through monitoring of an inline pressure sensor (in this instance as shown as tamper 460.1).

The flow of air for filling the air bladder 405 (as shown to be multi-segments 405.11, 405.12, 405.13, and 405.3, though understood to be a flexible in volume to fill the void between the cargo 410 and the fixed frames 1.3 and removable frames 1.1 can also be just one larger bladder 405 that can substantially fill any void space between) is regulated through an air valve 470.2 when the aft source to fill the air bladder(s) is external of the RPS or air valve 470.1 when the air source to fill the air is "sucked" into the air bladder with air pressure being created by a device also powered by the wireless power receiver 20.1. An internal air valve 470.1 is optimally a microblower as known in the art that can both suck air in or push air out with the microblower being in electrical communication with the wireless power receiver 20.1. It is particularly preferred that the filling or regulating of air pressure is done concurrently with the availability of power from the wireless power receiver (via the wireless power transmitter) so as to keep the energy storage 30.1 device at a minimal size. The pathway air flow is through the energy spreader in this embodiment being air transmission 450 line(s).

Analogous to FIG. 1, each RPS can receiver power through at least two separate wireless power receivers 20.11 and 20.12 served by respectively distinct wireless power transmitters respectively 25.11 and 25.12. The power is aggregated into one energy storage device 30.11 that provides power to one tamper sensor 460.11. Alternatively, one wireless power transmitter 25.31 can provide power to multiple distance RPS devices each having distinct wireless power receivers 20.21 or 20.22 with each being in electrical communications with their respective energy storage devices 30.21 or 30.22 and each being in electrical communications with the tamper resistance sensor 460.8 or 460.9. Each of the wireless power transmitters is in electrical communications with an electrical power source either directly or via a power bus 8.

Another feature of the invention, though shown substantially within the embodiment of the returnable/reusable packaging system is the need to maintain chain of custody (i.e., verification of authenticity). The inventive system in its most powerful implementation has an onboard microprocessor/controller in which continuous tamper resistance/ monitoring is maintained at all times as enabled by the onboard co-located energy storage system (though the continuity of tamper resistance monitoring is not required when the object being protected for at least authenticity is located in a physical space that is a secure space. A very important inventive feature of the system whether it has wireless power, is verifiable and authenticated object that has full chain of custody by integrating a non-reproducible identifier as an integrated component in the authenticated object such that the non-reproducible identifier is not able to be moved from the host object (without readily apparent damage) and in which the co-located microprocessor detects any attempts at tampering the object. It is absolutely necessary to realize the importance of BOTH tamper resistance and non-reproducible identification as otherwise a person (or automated system) assumes (and has no way of verifying true identification) for the object which has the identification can't be certain the unique identifier was not simply removed from the authentic object to a non-authentic object. Notably in the instance of a cargo transported within a reusable/returnable packaging system "RPS" a traditional tamper-resistance method (or identifier) moved within either a secure or non-secure transport methods is not adequate when a secondary goal of the invention is to move a cargo from within a secure RPS to a secure physical space such that the movement itself changes the state of the tamper resistance indicator at an earlier time than a person (or automated system) can validate both tamper resistance and identification as a precursor for chain of custody and therefore the inventive feedforward tamper control engine utilizes the integral tamper resistance engine (and a precisely accurate historic record of prior tamper evidence with a then subsequent time (i.e., then real-time but "future" relative to the time in which tamper evidence was realized). The exemplary wireless enabled picture frame often involves very valuable artwork as the "picture" and it is imperative to go beyond a security system within the host physical space by combining the identification and tamper evidence sensor reading to establish absolute authentication and the other additional features such as spot lighting for superior visibility. The requirement for spot lighting, largely needed during the personal observance of the artwork, is vastly superior when the lighting is powered via wireless power. However wireless power is woefully inadequate to meet relative peak power and it is both costly and inconveniently located in terms of wired electrical power. A physical object with a microprocessor/controller having an integral tamper evidence sensor such that a perturbation of tamper evidence change in status is logged in a then real-time historical record such that an authentication indicator must utilize a (now past) real-time historical memory record in combination with a (relatively future) time record and control through a feedforward decision framework to indicate the RPS authentication status.

A particular feature of the returnable/reusable packaging system is the use of RPS to ensure the safe and secure transport of cargo 410 from a first location to a last location (i.e., delivery for consumption) recognizing in an optimal system that leverages at least one of the segments of transport being through autonomous vehicles (and especially during delivery to the last location) that the RPS will not necessarily always be in a secure place such that stealing or damaging the contents cannot be absolutely ensured. Another aspect of the invention is the transfer of cargo 410 from within a tamper resistant and therefore secure RPS to either a secure space or to the final destination receiver (i.e., either ultimate consumer or designated authorized signatory) without placing the burden of RPS return for reuse onto that receiver. This creates the necessity to break the tamper seal (i.e., signal to the controlled device that the contents are no longer secure) prior to cargo control by the receiver. Yet, when the transfer takes place within a secure physical space the receiver needs to be made aware that in fact the integrity of tamper sealing and cargo authentication remains though a traditional output indicator would otherwise indicate such tampering. A further important aspect of the invention is to remove the cargo 410 from at least a portion of the RPS (or in fact even standard packaging such as cardboard box with individual air pockets not in structural communications with the packaging all sealed by tape ensuring to some degree tamper sealing and maintaining the cargo from not being damaged during transit) so as to not burden the receiver, nor the shipper, from respectively recycling (which is proven to not occur very often) the shipping container and of course the cost associated with that shipping container. In the current practice, most notably Amazon Prime, cargo is placed in a cardboard box with some individually filled air pockets to reduce the relative movement of the cargo during shipping and the cardboard box is typically optimized to minimize void space and therefore reduce the number or volume of air pockets. The inventive system does virtually the opposite recognizing that the optimization parameters are substantially different in an autonomous delivery system. Therefore the RPS is of a standardized size such that unauthorized physical access to the RPS and therefore the cargo is substantially minimized by transferring out cargo preferably within a secure transfer location that is physically size constrained to be have a gap between the secure transfer location space and the RPS size is at least less than the smallest component within the cargo. The size clearance gap is preferably less than 30% smaller on each dimension less than the RPS size, and more preferably less than 30% smaller than the smallest component from within the items comprising the cargo. Once within a secure transfer location all of the expensive components associated with making sure that the cargo arrives at its destination is able to remain in the secure transfer location and not become the responsibility of the consumer or signatory. With at least equal importance, all of those expensive components remain in the possession within the logistics infrastructure. Yet another very significant factor is that standardization reduces the cost of automation of movement of RPS within the logistics infrastructure and cargo placement in RPS or removal of cargo from RPS. Therefore, in this inventive system optimization for automation within an autonomous vehicle system for transport from a first location to a last location, including any intermediary transfer points, it substantially more important than space utilization within the autonomous vehicle cargo hold. The fundamental objective of standardization throughout the logistics system therefore creates the potential for a significant amount of void space within the RPS. The inventive system utilizes an air bladder, capable of being filled or emptied from within the RPS "shell" with the shell being the protective barrier against damage during transit and providing tamper resistance/sealing to the cargo. Having the air bladder with air communications for putting air or removing air from the air bladder from outside of the RPS into the RPS has a fundamental advantage of securing the cargo during transport such that the pressure created by the air bladder within the RPS is precisely tuned to the volume in which the void exists and the pressure desired as a further function of the type of components within the cargo. Yet a further aspect of the invention is such that the same pressure sensor measuring air pressure within the air bladder also serves as the tamper resistance seal, such that opening of the RPS will immediately reduce the air pressure of the air bladder. This integration also serves, if desired, as a function of time a record of changes in position indicative of motion notably bumps or other changes in force between the air bladder and the cargo. The placement of the air bladder sensor, in addition to desiring to secure the controller of the RPS, makes it highly desirable for authentication and tamper resistance to not be limited to an RFID device whether it be traditional or a very small solar activated identification device (e.g., p-Chip) requiring external access for identification. The latter being void of a microprocessor therefore entirely incapable of logic or writing to memory, and furthermore incapable of ensuring tamper resistance. In other words, a device that is only capable of identification cannot truly ensure supply chain integrity and is easily moved from one component to another therefore not really providing product component integrity or true authentication. The inventive method of ensuring tamper resistance from the first location to the last location by either continuous tamper resistance monitoring or a controlled device such that any discontinuity of tamper resistance monitoring is ensured to occur within a secure transfer location. Otherwise, the tamper resistance perturbation is written into memory with concurrent recordation of the time in which the perturbation occurred. The external mounting of a wireless power device (i.e., the p-Chip) can't provide tamper resistance. Further, if an accompanied microprocessor is required then there is no motivation to not use an authentication method integral to the microprocess such as Trustonic. The preferred embodiment of the invention, including the scenario of the RPS, has wireless power receiver integral to the controlled device. The wireless power receiver is of either RF energy (as noted such as Energous or Ossia) or solar (particularly preferred to be flexible such as organic photovoltaic). Clearly a solar wireless power receiver will not access any external energy until such time as the RPS is opened up. As noted earlier, this forces the tamper resistance monitoring to indicate a perturbation due to tampering prior to access to the interior of the RPS. This creates another challenge which this invention addresses, meaning access to energy for communications (which is substantially higher than the very small amount of power needed solely to monitor the tamper resistance sensor and to write at least one instance in which a tampering event took place.

It is an option when the wireless power receiver is solar/photovoltaic for the wireless power receiver to be external of the RPS, preferably co-located external with the microprocessor 3100, the air bladder pressure sensor which is in air communication with the air within the air bladder, and an energy storage device (i.e., battery) to provide power during periods of time in which the wireless power receiver is not receiving energy from the wireless power transmitter(s). An RPS, especially when such controlled device is utilized for the transport of perishable product (e.g., pharmaceutical, protein such as meat, produce), presents substantial challenges on energy storage devices that need to be overcome. These challenges include temperature limitations more restricted than conditions required to clean the RPS for its subsequent use in a next cargo transport from a next first location to a next last location.

The temperature issue can be addressed by placing the energy storage device in a phase-change material to modulate the adverse impact of a brief but high temperature exposure during the cleaning process. Therefore sizing the energy storage device to its absolute minimum size means that the energy storage device is sized only to provide tamper resistance monitoring (and if further desired temperature monitoring) preferably where the microprocessor only writes to memory when the monitoring leaves the normal operating envelope defined as a function of the type of components within the cargo. Given that communications, such as Bluetooth low energy, from the microprocessor to the overall logistics management system requires a substantial amount of energy beyond the simple monitoring requirement. Therefore, the RPS requires co-located wireless receiver to meet the then current peak power that greatly exceeds (by at least 30%) the peak energy supply (and typically also the total energy consumption) from the energy storage device. Though not essential to practicing the invention, it is desirable for the wireless power receiver to be as small as possible which then creates a challenge of alignment from the wireless power transmitted to the wireless power receiver. One embodiment to address this is to take a photo from a device having a light flash (preferably a high intensity light producing LED or even a laser) such that device also has an imaging device (i.e., a camera lens) to detect optical reflectivity of wireless power receiver signaling to the logistics system such that alignment can be automated (or manually indicated to the operator of the imaging device (which in most embodiments will be a smart phone). Once the actual position relative to the imaging device is established specific instructions are provided to ensure sufficient energy is provided to the wireless power receiver by the wireless power transmitter and therefore enabling communication between the controlled device (in this instance RPS) to the logistics system (or just to the tamper resistance and authentication system).

A further embodiment of the wireless power receiver is such that it is co-located and integral to a flexible substrate that further has an integral strain gauge such that the flexible substrate becomes another means of providing the tamper resistance monitoring. In this embodiment, the wireless power receiver is in structural communications with the RPS frame and another segment of the RPS frame that is removable in order to provide access to the cargo within the RPS. This method has the advantage of being removable during any cleaning processes or easy removal from the RPS such that when the frame and/or shell of the RPS are determined to be damaged and due for replacement, the expensive components of the controlled device (e.g., microprocessor, Bluetooth communications, energy storage, etc.). The system recognizes that variations of strain (air pressure when using an air bladder) may take place in which there is in fact no tampering but rather logistics movements taking place within the transport device (i.e., a container on top of itself or the contents within the package pressing upon the pressure bladder due to bumps on the road (i.e., road conditions). The system makes a distinction between tampering in which the opening of the container or package clearly also "places" light on the flexible solar cell therefore being a direct sensor for opening of the container or package. This is ideal, but it doesn't take into account that tampering can take place in the dark. Therefore, all things equal the logistics system requires dark areas to be ensured to be secure and that areas that are not secure and therefore susceptible to tampering should have sufficient lighting levels when the wireless power receiver is a solar wireless power receiver. Yet another preferred feature for the embodiment of a flexible substrate providing the tamper resistance monitoring is such that the same flexible substrate also provides sealing of the RPS between the first frame structural component and the second frame structural component in which the second frame structural component is removed from the first frame structural component in order to provide access to the interior space of the RPS. Since the fundamental goal of the RPS is to reutilize repeatedly, the flexible substrate has a dry adhesive (such that the adhesion takes place via van der Waals forces between the two frame structural components. The result is that the RPS remains pristine from a cleaning perspective and does not build up any adhesive residue creating both functional challenges but also the appearance of lack of cleanliness or "newness" associated with the RPS. It is understood that the dry adhesive can also be used as visible label on the RPS. Though it is understood that the unique identification is fundamentally provided and established via the microprocess, visual indicators for people or image sensor for computers serve a purpose. As noted, the RPS with a dry adhesive label for visual indicator doesn't leave a residue.

The particularly preferred embodiment of the invention is that the wireless power receiver not only receives power from an external source but such that the power is pulsed in a manner from the wireless power transmitter with an integral pulse communicating a part of the encryption key that enables the microprocessor to be further validate the authenticity of the communications with the microprocessor. The basis that a smart phone can provide power to the RPS via either a flash associated with the operations of the camera or via a wireless charging (operational in a bi-directional manner) enables no special equipment to be necessary to communicate and interrogate the RPS. This common piece of equipment therefore also requires highly secure methods of communication particularly when resetting a perturbation of the tamper resistance monitoring engine/system. The inventive system utilizes the feedforward portion of the controlled device to obtain an encrypted global reset at least based on one factor as obtained from a known global positioning system (as known in the art) "GPS" location. The smart phone utilizes that GPS location to communicate with the logistics system to obtain a location-dependent pulse frequency or signal code in which the wireless power will be transmitted. The more preferred embodiment is such that communication to the logistics system utilizes both the GPS location and a unique identifier only present within prior known and registered secure transfer point location. This combination also enables a further three-factor authentication to include a "scan" of the RPS container identifier and optionally yet another sealing identifier to access from the RPS microprocessor any perturbation records with its respective precise time(s) in which the perturbation occurred (e.g., a change of strain of the sealing device took place). The fundamental issue is such that user has a brief period of time to verify for non-tampering even if the user accidentally opens the container or package prior to performing the authentication/verification takes place.

As noted earlier in the preferred embodiment, wireless power (that is by design not available by the on-board co-located energy storage device) is required in order to fill the air bladder as required following placement of cargo in RPS and then closing/sealing the RPS and then activating the tamper resistance monitoring engine. Having the filling take place by a preferred piezoelectric actuated microblower (such as available by Murata) in which the microblower is within the interior space of the RPS enables the RPS to not minimize the potential contamination within the air bladder (of particular importance during the cleaning of the RPS). This power is needed only on an intermittent basis, but timing is coincident with the peak communications period of time as well. All of this enables the onboard energy storage to be substantially reduced by at least 20%, preferably at least 50%, and particularly preferred at least 90% smaller on-board energy storage such that wireless communications is a substantially significant power draw as compared to an energy storage device sizing required to fulfill communications, air bladder filling, and of course tamper resistance monitoring.

In summary, the preferred RPS embodiment has the following features: 1) no adhesion of adhesives for sealing device by leveraging only dry adhesives or mechanical actuator in structural communication with the frame of the RPS, 2) the ability for the sealing device to be used repeatably and to further serve as the critical element of the tamper resistance sensing, 3) an integral microprocessor that stores in memory the precise times in which the tamper sensor has a perturbation.

The RPS further includes an ultracapacitor capable of storing nominal amounts of power for monitoring of temperature. The use of the RPS for food products in particular, which require the RPS to be cleaned prior to reuse, demands the onboard energy storage to survive both refrigeration (and even freezing) temperatures as well as higher temperatures for killing any residual pathogens (though typically for a very brief period of time). A failback procedure is such that an electroactive polymer is integrated into the tamper resistance substrate that during a relaxation of the tamper resistance substrate created by a tampering event (without any wireless power available) an instant level of power into an ultracapacitor or capacitor only sufficient to write into the microprocessor the occurrence of a tamper perturbation which is subsequently communicated when the microprocessor obtains power through a wireless power receiver. Alternatively, the air bladder is made from (or at least contains a portion of the bladder substrate also with the electroactive polymer) the electroactive polymer. Therefore, the air bladder is both providing safety to the cargo while being the sensor for tamper detection and furthermore providing the failback power to the microprocessor. At the very least the tamper resistance detection device doubles as an instant power supply during the change in state of the tamper resistance detection device. The use of either the solid-state energy storage device (therefore void of electrolyte whether it be solid or liquid) or the electroactive polymer device eliminates potential contaminants to the cargo contained within the RPS, and certainly to the more challenging conditions during cleaning for both deterioration of the energy storage device as well as contamination to the cleaning solution. The electroactive polymer also creates energy at the time the tamper resistance device is placed on the RPS activating the tamper detection state, therefore sufficient power (even when no wireless power is available) is provided to the microprocessor such that the microprocessor writes both the time of tamper resistance activation as well as the lack of sufficient power to provide continuous power. Furthermore, when sufficient power exists beyond the tamper resistance activation time, the microprocessor writes to memory immediately prior to running out of power the status of tamper resistance detection and the low power event at the time in which power is about to become insufficient for one last write operation. This is critical, as the subsequent communication to the logistics system that occurs concurrently with the providing and receiving of power through the wireless power transmitter and receiver respectively, otherwise would not alert the final receiver or authorized signatory of the lapse in detecting tamper resistance. In this instance, the final receiver or authorized signatory must conduct a manual (or automated) verification of cargo contents as well as authentication preferably using measures that establish at least a probability of reaching the final destination without any unexpected exposure within non-secure locations in which tampering, or adulteration can take place.

The preferred embodiment works exceptionally well for reusable packaging, particularly where the reusable packaging needs to be washed in thermal conditions that exceed ratings of electricity storage conditions. The now much smaller energy storage device has enhanced thermal isolation by the inclusion of a phase-change material, now also substantially smaller (at Fast 5%, preferably at least 50%, and particularly preferred at least 90%) than a non-wireless powered device, of the cleaning environment from the energy storage device (e.g., electricity battery) during the short duration of washing. Decreasing the size of the onboard energy storage device not only reduces the size and cost associated with the energy storage device but it also reduces the surface area of the energy storage device therefore reducing the heat transfer into the energy storage device and therefore reducing the cost and total physical size of the phase change material used to thermally isolate the energy storage device from the cleaning environment. Therefore, the inventive system reduces the physical size of electricity storage predominantly for the purpose of monitoring sensors (e.g., temperature, humidity, pressure) and logging primarily exceptions outside of normal operating range. In other words, the energy demands which are greatest on a peak-power basis being communications are not burdened to the onboard energy storage device but predominantly the burden of the wireless power transmitter and receiver (the only portion that is onboard). The result is that the significantly higher power requirements required during external data communications are met via the wireless power receiver and its transmitting infrastructure. An additional, though optional feature integrates a superhydrophic coating (shown over wireless receiver as 888.1 or shown over the exterior of the RPS as 888.2). The superhydrophibic coating reduces the heat transfer via conduction occurring particularly when the RPS is being washed or cleaned using a fluid (especially when such fluid is at a temperature above critical temperatures as known in the art to reduce pathogen contamination) as the coating decreases by over 90% and preferably over 95% the direct surface to liquid interaction by the inverse expansion of air to fluid interaction. It is further understood that the superhydrophic coating is substituted with an omnipohobic and antimicrobial coating as the unique combination reduces the amount of water (and soap) required in between RPS uses due to the ease of solids (including pathogens) from sticking to the RPS, The preferred embodiment reduces water consumption in between uses by at least 5% and preferably by at least 20% as compared to an RPS without either of superhydrophobic or omniphobic (with or without antimicrobial features). The further advantage of the antimicrobial features is reduced biofilm growth, a very difficult to remove material from the RPS surface.

The invention takes advantage of pre-arranged Bluetooth pairing such as detailed in Qualcomm U.S. Pat. No. 9,191,988, but further limits this pre-arranged pairing constrained to a limited time range and optionally also a geofence range in advance to make the communications process even more secure. The further improvement is such the Bluetooth pairing application is further encrypted by an on-board key (that is used as a 2-factor) in the on-board key is part of the container itself beyond a key within the processor (therefore only the combination of the container key and provision of a 2nd key via a Cloud service) when specifically unlocking the container and also reading the tamper log, and more specifically when resetting the tamper log for next use. This pre-arranged pairing importantly reduces the amount of power consumption. Another significant power consumer for the controlled device (when it is an RPS) is the power required to unlock the latch/lock from inside, therefore the inventive feature also uses wireless power to perform the switch between locked and unlocked as well as vice-versa. One benefit when the wireless power is optically powered is the inherent requirement to unlock the controlled device must take place in a lighted area (and more particularly such that the light source is flickering with the proper encryption code range that is also preferably pre-arranged and stored within the microprocess memory).

The particularly preferred embodiment of the RPS has an integral sliding door, similar in performance of a garage door that opens as soon as unlocked (i.e., it is spring-loaded) such that when closed it is spring-loaded to open. A superior embodiment also has the ability to close with minimal effort when the RPS is empty also through a spring-loaded method. It is understood that such a spring can be replaced by an electroactive material as known in the art whether it be for movement of the integral sliding door (or any other means of opening or closing access to the cargo within the RPS). The electroactive material can also be used within the locking/unlocking mechanism to activate/enable the sliding door to change its status from closed to open (and vice versa). A particularly preferred method is such that the energy required to move the integral sliding door is also wireless including magnetic coupling whether it be through magnets or magneto-rheological fluid. This embodiment further reduces the onboard peak-power requirement and therefore the ability to open or close the integral sliding door simply needs to be locked/unlocked by onboard power as controlled by the onboard microprocessor. As known in the art, this can be through either a rotating or a linear actuator. A magnetic latch is ideal such that open and close mechanism is only reachable from inside the container.

Figure 3:
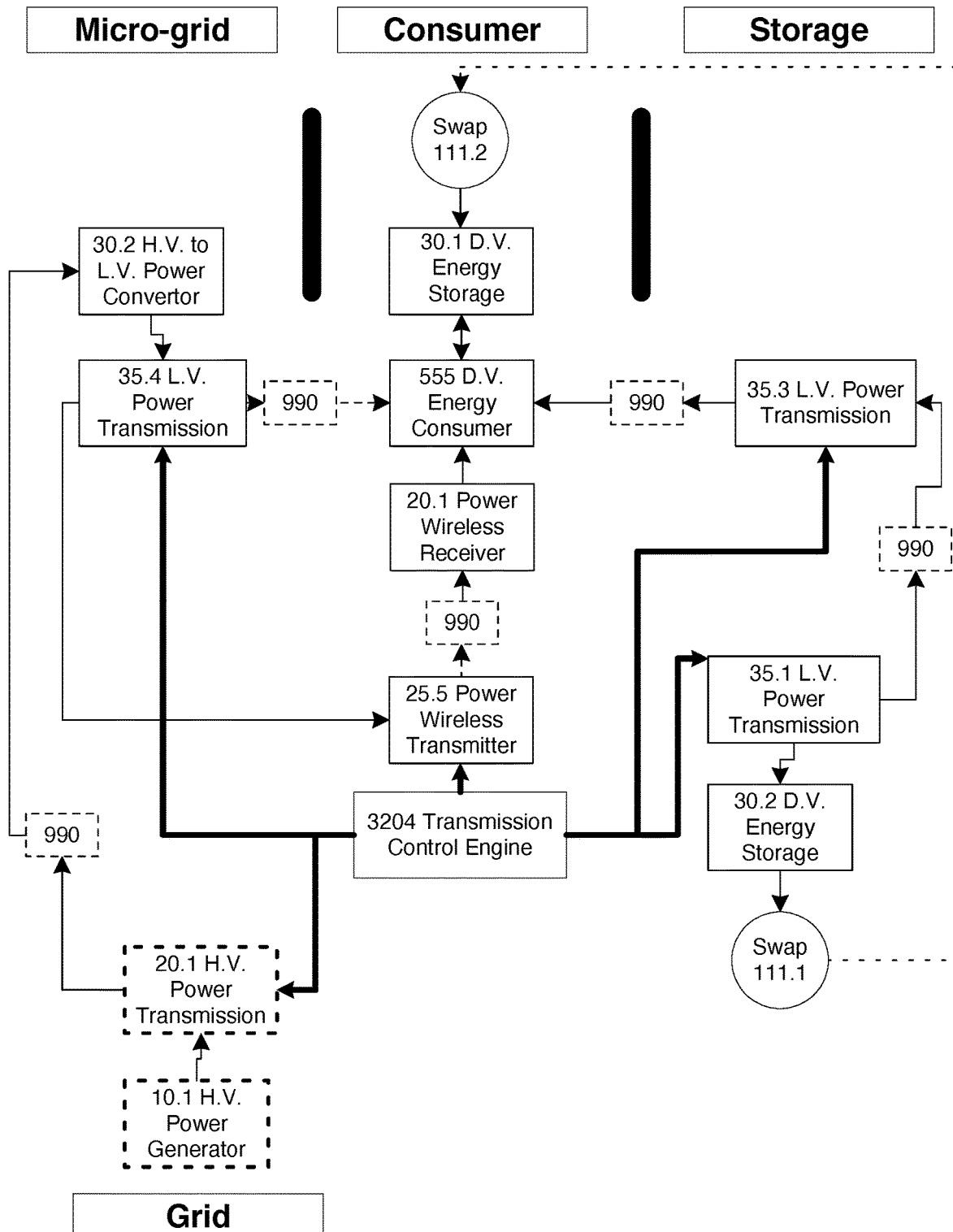
FIG. 3 is an energy flow diagram from power generation source through wireless power distribution.

Turning to FIG. 3, FIG. 3 depicts the upstream portion of electrical distribution prior to reaching the wireless power transmitter(s). The 990 voltage regulators have embedded energy circuit isolation and modulated (preferably variable energy flux modulation, though also can be binary open/close) flow regulation. In addition, the 3204 transmission control engine "controller" is in communications (whether it be wired or wireless as known in the art) with each segment of the power transmission (as shown 35.1 L.V., 20.1 H.V., 35.3 L.V., and 35.4 L.V.) via sample points and sensor states as well as notably either directly or indirectly to the power wireless transmitter 25.5. The power wireless (also interchangeably referred to as wireless power) receiver 20.1 provides an at least one pathway for electrical energy to the ultimate energy consumer 555 operating on a distributed voltage level that further optionally has at least two independent, isolated, and/or regulated energy control devices 990 such that each energy source pathway is segmented from the others and that the 3204 controller dynamically modulates the system energy flow with a primary emphasis on maintaining no more than 98% of total consumer energy from an individual wired power transmission (35.4 L.V. or 35.3 L.V.) and preferably no more than 50% of total consumer energy from an individual wired power transmission, and more specifically preferred that the power transmission rated capacity is no more than 20% of the peak power rating of the 50.3 L.V. energy consumer.

The dynamic and distributed energy storage system has virtually all aspects of energy transmission coordinated by a controller. The controller has computer memory, as known in the art, such that at least a portion the memory is non-transitory memory. Memory is utilized to coordinate through a reservation engine individual charge and discharge transactions that are configured, scheduled, and dispatched in a time series interval of at least one charge reservation and at least one discharge reservation for each of the networked individual energy storage devices. The reservation engine also links the individual energy storage devices to at least one energy consumer that is directly co-located or at least in energy communications with at least one energy consumer. The energy storage device can serve multiple concurrent energy consumer devices concurrently or as represented by an aggregate of individual energy consumer devices. In this instance, the reservation engine may not actually be able to differentiate between an individual energy consumer or the aggregate yet the fundamental requirement of maintaining each pathway that energy travels must remain below the maximum threshold.

The 555 energy consuming device having electrical communications with the power wireless receiver 20.1 is also referred to as a wireless network energy storage device (or just a network energy storage device) as well as the energy consumer devices are decoupled from an energy producing asset(s) including an at least one energy production generator 10.1 (shown as a high-voltage source) through a high-voltage power transmission device 20.1 producing a primary energy source at a first location that is at a different location from the energy consumer 555 device. The particularly preferred primary energy source is direct current "DC" when the energy source is electricity, and specifically preferred DC energy source has a low voltage preferably defined as a voltage typically associated with telecommunications voltage and particularly within the geographic standards such that electrical wire doesn't require rigid conduit and doesn't require "home runs" back to a main distribution panel. The preferred embodiment is such that electrical wire is free from wire interconnection restrictions between energy flow regulators. The particularly preferred embodiment is such that electrical wire between each energy flow regulator is isolated from other electrical wires connected to the same energy flow regulator, and likewise the preferred embodiment is identical for each energy consumer such that multiple independent energy pathways are provided to the energy consumer. The additional use of wireless power is a primary aspect of the invention, as shown to be first in electrical communications and controlled via the transmission control engine 3204. Wireless power in combination with distributed energy storage has a fundamental advantage of reducing exposure to wireless power (i.e., electrical and/or magnetic) fields during actual use of energy consumers (i.e. occupancy of the common space) between the wireless power transmitter 25.5 and the wireless power receiver 20.1, optionally further regulated through 990, for ultimate energy consumption by the energy consumer 555 at direct current voltage.

Figure 4:
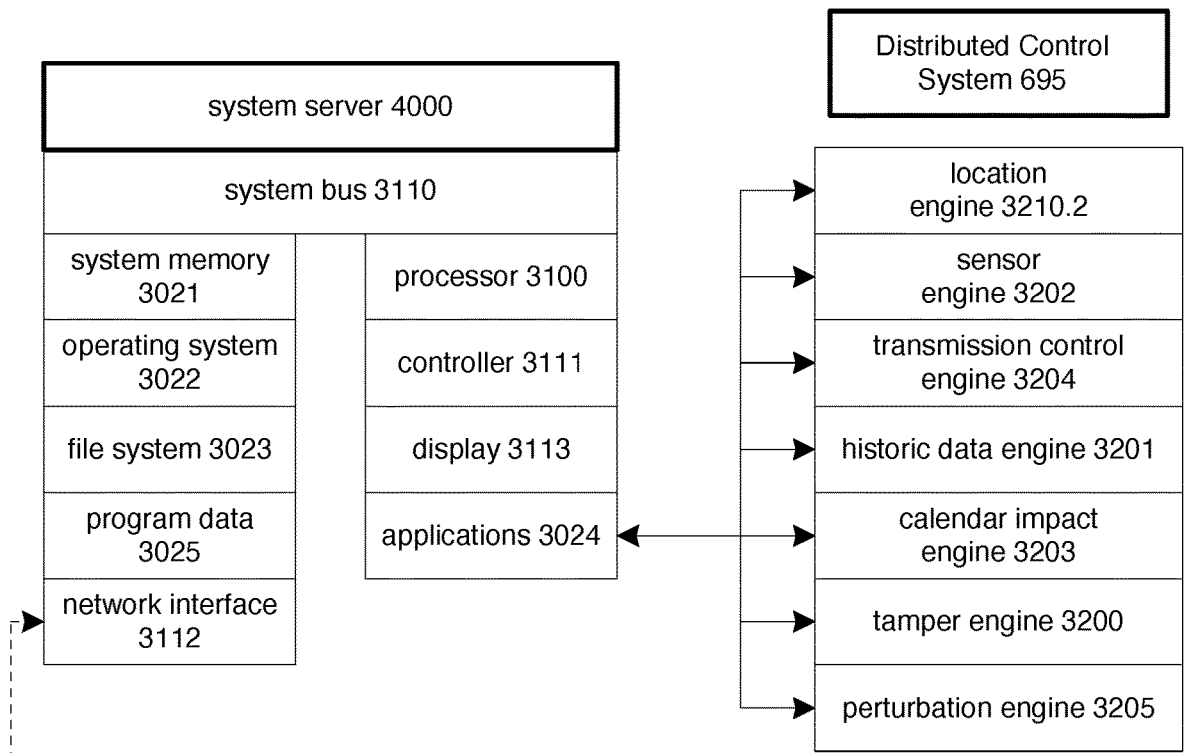
FIG. 4 is a communication flow diagram of controller architecture of the wireless power system.
Figure 4:
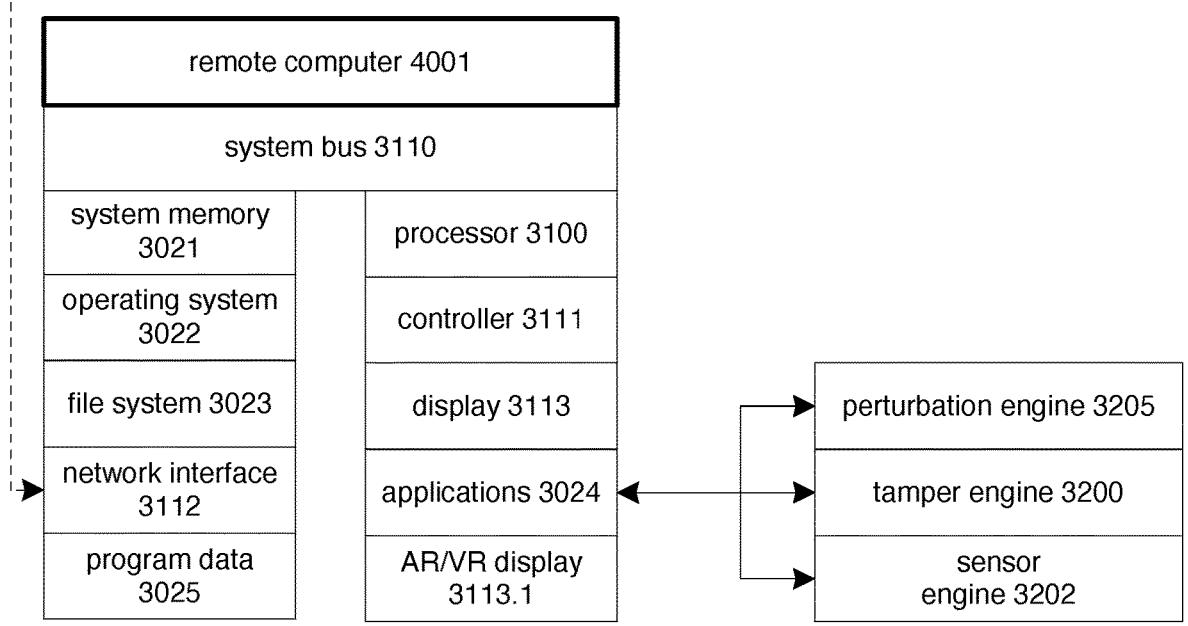

Turning to FIG. 4, FIG. 4 is a communication flow diagram of controller architecture of the modular distributed and segmented energy storage system. The system has at least one system server 4000 with either integral (though not shown as distinct) or a remote computer(s) 4001 in which a historic data engine 3201 such that in the aggregate the feedforward with feedback controller is capable of optimizing energy flow to each of the wireless energy consumers 555 (not shown in this figure). Both the system server 4000 and remote computer 4001 have a hardware system bus 3110 integrating the system memory 3021 operating an operating system (preferably real-time) 3022 to operate programs stored in a file system 3023 to access program data 3025 as determined by the processor 3100 in conjunction with a controller 3111 (having an optional display 3113 or augmented reality/virtual reality display 3113.1) processing a range of applications 3024. Each wireless energy consumer 555 preferably has a distributed control system, though not shown, also has a hardware system bus 3110 integrating the system memory 3021 operating an operating system (preferably real-time) 3022 to operate programs stored in a file system 3023 to access program data 3025 as determined by the processor 3100 in conjunction with a controller 3111 (having an optional display 3113 or augmented reality/virtual reality display 3113.1) processing a range of applications 3024. The inventive feedforward-feedback control system has a location engine 3210.2 that preferably has a geospatial map of each vector and the vectors are in a multi-dimensional space domain (i.e., vector can be in a 2-dimensional or 3-dimensional representation showing relative dimensions or orientation to the other interconnected vectors relative to the energy flow segment), a sensor engine 3202 reading each connected sensor (notably current and voltage in real-time for at least each vector and segment) as well as leveraging machine learning to establish meta-sensors (i.e., virtual data establishing superior predictive capabilities particularly as the meta-sensor data contains data ranging from weather to calendar impact as obtained from the historic data engine 3201 including time of day, and preferably time of day overlaid with the other data impact engines) and calendar impact engine 3203 (date specific data such as holiday, day of week, season, etc.) and environmental engine 3200 (data specific to environmental parameters such as allergies, fires, combustion emissions, etc.) all bundled into a decision matrix coordinating energy transmission, energy storage, and energy consumption via the transmission control engine 3204 such that each regulator/switch (not shown 990) and each vector within each segment is precisely coordinated across at least energy flow current and preferably also voltage. The perturbation engine 3205 specifically implements an overlay of historic data with at least one of location engine, calendar impact engine, and environmental engine to establish increasing accuracy of energy consumption of each energy consumer connected to the inventive distributed energy storage system. The transmission control engine 3204 is a composite control system that regulates energy transmission and is the heart of the feedforward application such that the combination with the perturbation engine 3205 improves the system cost efficiency by at least 5% and preferably by at least 20% over a non-wireless power energy flow system without the combination of the feedforward applications and perturbation engine. Important features of the embodiment leverage the wireless power capabilities, particularly the communications aspects, to determine any tampering of the wireless energy consumer 555 through the tamper engine 3200 rules logic embedded into the wireless energy consumer 555 (or in alternative instances independent of the wireless power components).

Figure 5:
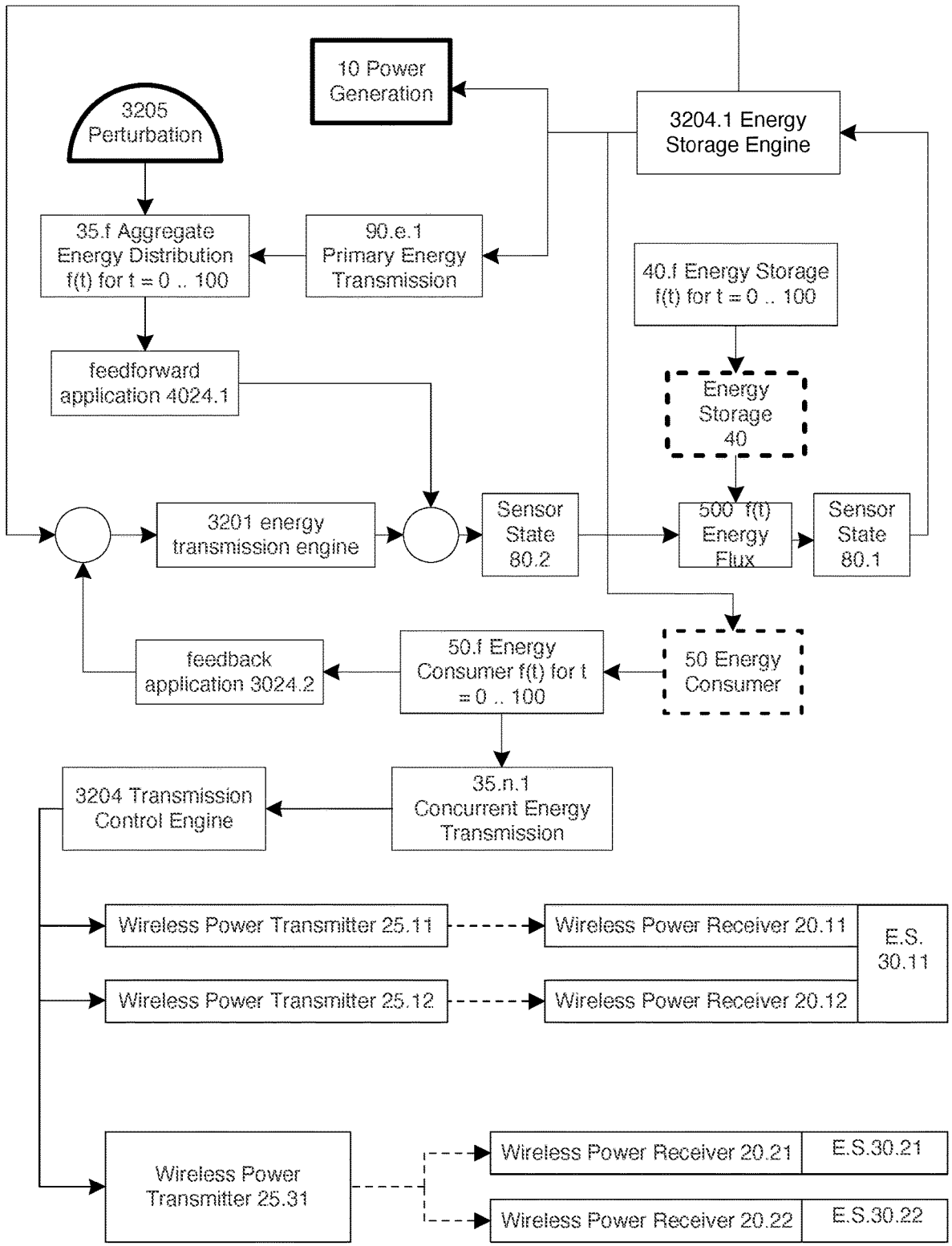
FIG. 5 is a control flow diagram of the controller depicting the feedforward with feedback architecture for the energy control segment of the wireless power system.

Turning to FIG. 5, FIG. 5 is a process logic flow diagram of the controller depicting the feedforward with feedback architecture such that each connected (and notably those that have communications capability with the distributed control system e.g., IoT or M2M as known in the art) energy storage 40, power generation 10 generator, and energy consumer 50 is directly or at least indirectly via regulator/switch 990 state maintains current and voltage thresholds through the concurrent energy storage devices 30.11, 30.21 and 30.22 whether directly from transmission control engine 3204 (as for 30.11) or via wireless power transmitter 25.31 (as for 30.21 and 30.22). The instance of wireless power transmitter 25.11 and 25.12 is indicative of an exemplary where a single energy storage device 30.11 receives power through at least two wireless power transmitters 25.11 and 25.12 whether the transmitters transmit concurrently from two different locations or at different independent times to their respective wireless power receivers 20.11 and 20.12. Another instance as depicted by wireless power transmitter 25.31 is exemplary of the transmitter 25.31 serving multiple wireless power receivers 20.21 and 20.22 whether it be concurrent or at different independent times to distinct energy storage devices 30.21 and 30.22. The feedforward portion of the control system preferably provides power generation signals (or at least is responsive to power sources as made available by power generation 10 generators (including energy storage devices external of the distributed control system) through the primary energy transmission grid 90.$e$.1 (understood to be at least one source, such that the system has a primary energy transmission grid) creating an aggregated energy distribution collective 35.$f$ as a function of time. The perturbation engine 3205 in combination with the feedforward application(s) 4024.1 for each type of energy flow improves the feedback portion of the control system responding to real-time actions definitively maintaining each vector and each energy storage device and each energy consumer within their respective operating envelope (i.e., below their maximum thresholds such as obtained by sensor state 80.2 e.g., voltage and sensor state 80.1 current) to regulate energy flux/flow 500 in real-time to each connected energy storage 40 device (plus by way of extension energy storage devices available only through wireless power transmission 30.11, 30.21, 30.22 becoming an aggregated energy storage as a function of time 40.$f$. The feedback portion also includes at least over-riding regulation and control of energy consumer(s) 50 through an aggregated function of time 50.$f$ for each type of energy through the feedback application 3024.2. It is a fundamental inventive aspect of the system such that concurrent energy storage charging within an individual vector occurs with energy storage discharging within a different individual vector such that additional energy flow capacity within a given vector is utilized to greatly reduce (by at least 5%) instances in which energy consumers do not have adequate energy flow through its respective energy flow pathways to meet its real-time energy demand. The fundamental objective is such that the energy flow pathway from the power generation 10 generator is never required to meet the real-time demand of any given energy consumer 50 to reduce peak transmission capacity through a distributed co-located energy storage 40 device (and wireless connected energy storage devices e.g., 30.11) such that at least one energy consumer has at least two individual concurrent energy transmission 35.$n$.1 pathways to serve peak demand energy consumption.

The preferred method of system control utilizes the tracking of variable states of including transient conditions, whether it be by host performance data, weather data, environmental data, calendar data or grid data including grid pricing data collectively referred to as input data. The primary factors impacting the variable states are the energy storage systems as regulated within the segment they are in energy communication with by a first beginning energy flow isolation switch and a second ending energy flow isolation switch (except when the segment is a terminating segment), and energy consumers within the same segment as in direct energy communication to the segment energy pathway transmission or a separate and individually connected energy storage device in energy communication with the energy consumer. The energy flux is a calculated parameter based on each segmented power transmission segment based on a current sensor and a voltage sensor reading, with another important parameter including the energy storage charge or discharge rate and also energy consumption of each of the energy consumers being a reference transient to predict energy flux as a function of time combined with machine learning patterns as obtained and correlated to historic data, calendar impact data, environmental data and weather data. The primary function of the feedforward control system is to establish a variable based on the predicted energy flux of each segmented power transmission segment and an aggregate energy distribution of the each segmented power transmission segment such that a shortfall of energy to each energy consumer is avoided by ensuring sufficient stored energy is available as a function of time on either the same segment in which the energy consumer is on or neighboring segments such that the aggregate current demand (within the voltage threshold) doesn't exceed the current threshold for any of the interconnected segments in which energy flow must take place to meet both the individual demand of each energy consumer as well as the aggregate within each segment. A feedback variable, as determined by the systems control processor establishes a control variable based on a multivariable coupled combination of the feedforward variable and a feedback variable leveraging real-time current and a real-time voltage as available through sensors on each segmented power transmission segment such that energy flow is regulated to prevent the maximum current threshold and the maximum voltage threshold from being exceeded. The multivariable coupled combination of the feedforward variable and the feedback variable is calculated by a discretized dynamic equation (including a vector pattern recognition as established by machine learning as known in the art) with control of each energy flow isolation switch and the energy storage charge or discharge rate for each of the energy storage systems, the aggregate energy distribution as a function of time for each of the segments, and both individual and aggregate stored energy states (both real-time and projected as a function of time) of each of the energy storage systems. An open loop scheduler of scheduled events for energy consumers establishes discrete energy flux demand in combination with the feedforward projected energy flux demand. Variations can occur in an uncontrolled manner from the scheduled events becoming real-time disturbances as compared to the open loop scheduled energy consumer individual and aggregate demand. The control system contemporaneously controls operation of the segmented energy storage system based on the control variable, notably the charging and discharging of energy storage devices including the "movement" of stored energy from one segment to a second segment in anticipation of the energy flow pathway transmission segment being insufficient to meet energy consumer demand without otherwise exceeding the maximum current and/or maximum voltage thresholds.

The control method can suppress through disturbance rejections to attenuate the effects of uncontrolled energy consumers. The control method obtains input data, also from the uncontrolled power generation generators in an interconnected grid or from a combination of uncontrolled or controlled power generation generators on a micro-grid. The control system can apply a method of calculating a new location for any of the energy storage systems relative to another segmented power transmission segment based on a feedforward calculation (i.e., projected) of future current and voltage demand for each segment, and then subsequently issuing manual or automated movement commands for the repositioning of the energy storage system. When the energy consumer is either transportable or capable of being moved and the energy consumer is preferably outfitted with a wireless power receiver the control system can alternatively issue movement commands for the repositioning of the energy consumer off of a first segment to another segment. The control system provides a multivariable feedback control loop having dynamic tuning by the control system to contemporaneously control the operation of all interconnected energy storage device and energy consumer devices within the modular distributed energy system.

A particular inventive feature is energy consumption as a function of wireless power available and battery storage available, and predicted wireless power available as f(t), and energy consumption as f(t) such that leads to a feedback and feedforward control logic; variation of which devices receive wireless charge (by distance, direction, and receiver on/off state) by prioritization allocation, difference of wireless power available allocation slice and battery storage available, and predicted wireless power available as f(t), and energy consumption as f(t). The inventive system also then determines when a battery with a higher charge level may be swapped for a variety of reasons ranging from battery health, battery outgassing probability, potential for thermal overrun, or even insufficient available power to meet projected power requirements of a host consumer such that only a new battery can meet the demands (or a fully charged battery with high battery health).

Figure 6:
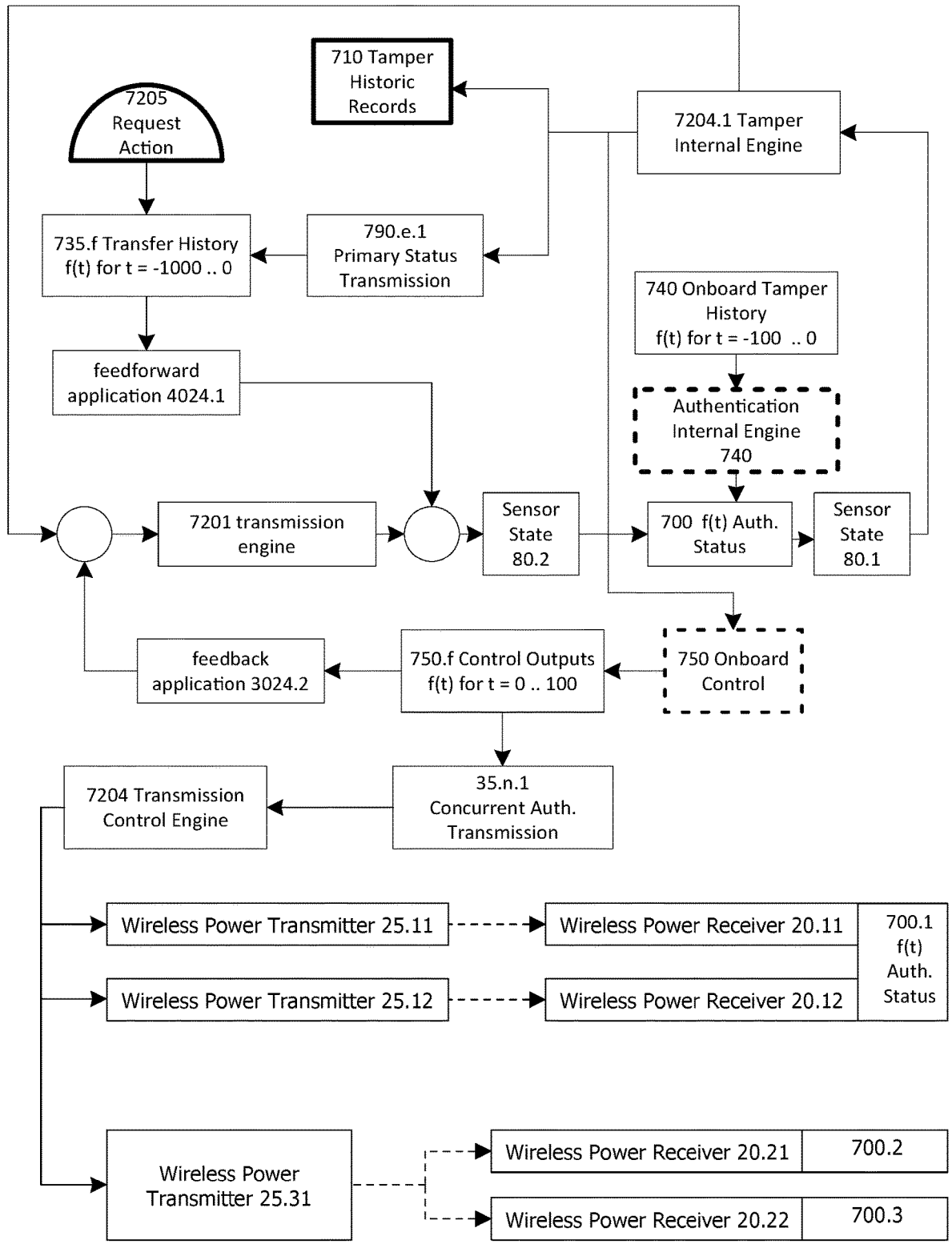
FIG. 6 is a control flow diagram of the controller depicting the feedforward with feedback architecture for the tamper detection and authentication control segment of the wireless power system.

Turning to FIG. 6, FIG. 6 is a process logic flow diagram of the controller depicting the feedforward with feedback architecture such that each connected (and notably those that have communications capability with the distributed control system e.g., IoT or M2M as known in the art) authentication device through the authentication internal engine 740, tamper historic records 710, and onboard controller 750 is directly or at least indirectly via sensor state 80.2 maintains authentication and/or adulteration thresholds through the concurrent authentication devices 700.1, 700.2 and 700.3 whether directly from transmission control engine 7204 (as for 700.1) or via wireless power transmitter 25.31 (as for 700.2 and 700.3). The instance of wireless power transmitter 25.11 and 25.12 is indicative of an exemplary where a single authentication device 700.1 receives power through at least two wireless power transmitters 25.11 and 25.12 whether the transmitters transmit concurrently from two different locations or at different independent times to their respective wireless power receivers 20.11 and 20.12. Another instance as depicted by wireless power transmitter 25.31 is exemplary of the transmitter 25.31 serving multiple wireless power receivers 20.21 and 20.22 whether it be concurrent or at different independent times to distinct authentication devices 700.2 and 700.3. The feedforward portion of the control system preferably provides authentication and/or adulteration signals (or at least is responsive to tamper sensors as made available by sensors 80.1 (including authentication devices external of the distributed control system) through the primary status transmission 790.e.1 (understood to be at least one source, such that the system has a primary authentication status) creating an aggregated transfer history distribution collective 735.f as a function of time for each authentication device. The perturbation engine 7205 in combination with the feedforward application(s) 4024.1 for each type of probable tamper event improves the feedback portion of the control system responding to real-time actions definitively maintaining each host authentication device within their respective operating envelope (i.e., below their maximum thresholds such as obtained by sensor state 80.2 e.g., tamper and sensor state 80.1) to regulate authentication status as a f(t) 700 in real-time to each connected authentication device (plus by way of extension authentication devices available only through wireless power transmission 700.1, 700.2, and 700.3) becoming an aggregated onboard tamper history as a function of time 740. The feedback portion also includes at least over-riding regulation and control of onboard control(s) 750 through an aggregated function of time 750.f for each type of control output(s) through the feedback application 3024.2.

It is a fundamental inventive aspect of the system such that upon a request action 7205 to determine an adulteration and/or authentication status is at least 5% superior (than without a feedforward system) more accurate than solely a feedback control system. The 35.n.1 concurrent authentication transmission leverages at least one authentication or adulteration status 700.1 or 700.2 or 700.3 in combination with a transfer history 735.f as a function of time, notably when the transfer takes place at a time following an authentication sensor status change occurs. One exemplary instance is that the movement of a container/storage items within a vehicle device causes a change in authentication sensor status (such as may occur when the vehicle device goes over a bump on the road creating a disturbance, yet it is known with certainty that the vehicle device is in a secure state at the time in which that disturbance occurred).

In summary, the inventive feature of the feedforward control system for authentication and anti-adulteration confirmation is that it is not possible to determine an accurate authentication status utilizing only a feedback control system based on real-time sensor state points. The determination must take place utilizing sensor state points that are adjusted after the last change in real-time sensor state points at the current location in which the RPS is seeking to establish confirmation that no tampering or adulteration has transpired since the RPS was last in a secure location/geofence. Historic records 740 are insufficient as a stand-alone source of sensor status without feedforward adjustment at a future time beyond the time of the last authentication sensor state change. In many respects the inventive control system is more accurately depicted as a future adjusted feedback control system (i.e., feedforward adjustments of retroactive feedback control system).

One exemplary comprehensive embodiment of the reusable package system traces the lifecycle of a single reusable container, understanding that each reusable container and also for each contained cargo within the reusable container has to be independently calculated and assessed. The reusable container has a first container structural element and a second container structural element representing that when the two structural elements are in physical contact with each other it represents when the reusable container is closed further representing that reusable container maintains the status of the contained cargo so as to prevent tampering of the contained cargo and therefore maintain the status of the contained cargo being authenticated. The two structural elements when not touching each other is indicative of when the contained cargo is being placed or removed from the reusable container such that when that takes place in a secure area (or within a secure logistics vehicle) that action is considered to a false positive as the secure area is an acknowledgement that tampering or in-authentication doesn't take place in the secure area. Each change in state of the tamper evident sensor, unless in a confirmed secure area, is written into memory within the reusable container's embedded microprocessor. Sufficient energy from the onboard energy storage is ideally maintained such that =a real-time status of the tamper evident sensor is written into memory or is externally communicated by the wireless power receiver in electrical communications (as powered by a first electricity source external of the reusable container) through an at least one wireless power transmitter at a first location (i.e., at least a distance of 2 inches (preferably at least a distance of 6 inches) from the reusable container. The energy storage device within the reusable container is ideally not sufficient to meet the real-time peak electricity transmission rate alone and therefore draws the balance of the differential through the wireless power transmitter (the energy storage device, a.k.a. onboard energy storage, with an onboard stored energy amount and a maximum discharge rate whereby the onboard stored energy amount and the maximum discharge rate of the onboard energy storage exceeds an at least memory writing energy amount to register any tamper evident sensor status change in the embedded microprocessor memory device (or communicated external of the reusable container via wireless communications transceiver). Wireless communications in fact consumes a disproportionally high amount of energy (i.e., as compared to microprocessor operations between sleep cycles for obtaining sensor input status) peak electricity consumption rate during external communications between the wireless communications transceiver at the first location (typically a stationary and fixed location e.g., the loading location) and the reusable container wireless transceiver at the second location (indicative of any location where the container moves up until the time contained cargo is removed) is greater than the maximum discharge rate of the onboard energy storage (i.e., the energy storage device is purposely down-sized for a range of reasons from cost to ability to protect during cleaning cycle) and an external communications energy consumption total is greater than the at least memory writing energy amount.

The reusable container optimally contains an air bladder filled to an internal air pressure serving the function of protecting the contained cargo during moving of the reusable container from location to location while also concurrently being an effective sensor to determine tampering as a tamper evident sensor to detect the relative movement between the first container structural element and the second container structural element (i.e., when opening or closing the container) such that a decrease in the air bladder's internal air pressure decreases when the first element moves away from the second element (and potentially increases when the first element moves towards the second element) both creating relative movement. Yet an additional feature of the air bladder is effective insulation so as to reduce heat transfer in or out of the contained cargo to the environment outside (i.e., external) of the reusable package system.

The optimal sizing of the energy storage system has an aggregate energy consumption amount as consumed by the reusable container (for at least each cycle of loading through unloading of contained cargo). It is an objective to minimize the energy storage size so as to only have sufficient energy to detect tamper evident status sensor changes throughout its transit. Therefore, it is an objective to obtain at least 10% of the energy from the wireless power receiver as compared to the reusable container without the wireless power receiver.

The wireless power transmitter is optimally capable of modulating the wireless power transmission frequency rate or to overlay an embedded wireless power signal on a non-fluctuating wireless power transmission level such that the a resulting signal provides an authentication key that is a function of the first location with an integral authentication key of the first location that matches a previously stored encryption key in the reusable container. The system obtains vital information, such as location of manufacturer, shipper, secure logistic vehicle in advance by way of invoices or purchase orders or shipping bill of laden as another method to increase probability of authentication. As such the embedded microprocessor is pre-populated with encryption keys that match the integral authentication key of the first location with the then previously stored encryption key in the reusable container. Having the matching authentication key signals particularly registering/writing into memory a tamper evident sensor status change. This includes the presence of the authentication key concurrently with changing the state during unloading cargo from the reusable container or placing the reusable container in a secure mode where a reset of the memory of the tamper evident sensor state takes place (such as preparing the reusable container to move a next contained cargo, especially with a cleaning step in between sequential contained cargos.

The wireless power transmission frequency rate or an embedded wireless power signal is preferably different for each known location such that the integral authentication key of the first location that matches a previously stored encryption key in the reusable container notably a key specific to an authenticated cleaning device at an authenticated cleaning location to enable the reusable container to register a reusable container cleaning confirmation status.

Shipping of contained cargo, such as through a secure logistics vehicle (a prior acknowledged vehicle as being both secure and authenticated) enables the microprocessor to effectively ignore (reduce perturbations on the control logic predicting tampering or disturbances to authentication state) internal air pressure deviations of at least 0.5 psi (or preferably at least 0.1 psi) in internal pressure indicative of either a shift in position of a contained cargo within the reusable container or an external transportation condition (such as road bumps, vehicle acceleration or deceleration) of the secure logistics vehicle. This knowledge enables the embedded microprocessor to forego energy consumed from the onboard stored energy amount by not registering the sensor status change in order to be an energy saving feature and a memory saving feature (as various memory types have limited read/write cycles).

Another feature of one embodiment is when electricity is provided in the same method as known in the art by a solar panel (i.e., photovoltaic) though in this instance an artificial light source is anticipated for conversion into an electricity source by the wireless power receiver.

The particularly preferred system provides consumers of the contained cargo with a probability assessment of tampering and therefore a decrease in likelihood that the contained cargo remains unadulterated and therefore authentic. Changes in onboard tamper sensor status changes and/or maintaining contained cargo transfer historic events for each location is used to calculate an authentication output that is a time series function of both the contained cargo transfer historic events and onboard tamper sensor status changes. Changes based on the predicted authentication output for each of the locations are used by the system to issue verification and/or corrective actions based on such changes at its respective data acquisition location. It is understood that remote processing of this information, such as in the cloud or internet of things protocols are assessed by another processor external of the reusable container such that a feedback variable and a multivariable coupled combination of the feedforward variable and a feedback variable is based on a discretized dynamic equation. Each recalculation takes place after a change in state of during cargo transfer historic events and/or onboard tamper sensor status changes or the additional authentication tracking state. These change in states are disturbance(s) within either feedback or feedforward portions of the control system including the portion that is an open loop to predict the authentication output. A disturbance rejection to attenuate changes of onboard tamper sensor status takes place when the cargo is moved by a secure logistics vehicle between locations.

The ultimate goal is to solve an authentication and tamper probability based on at least the change in state of cargo transfer historic events or tamper sensor status changes to compute by the authentication module that further transmits a feedforward signal for the purpose of pre-planning the authentication output for each contained cargo. The probably is also reassessed for every instance when additional authentication tracking state data is obtained for each logged location. The lower the probability of the authentication output leads to a range of authentication confirmation actions on the contained cargo.

Figure 7:
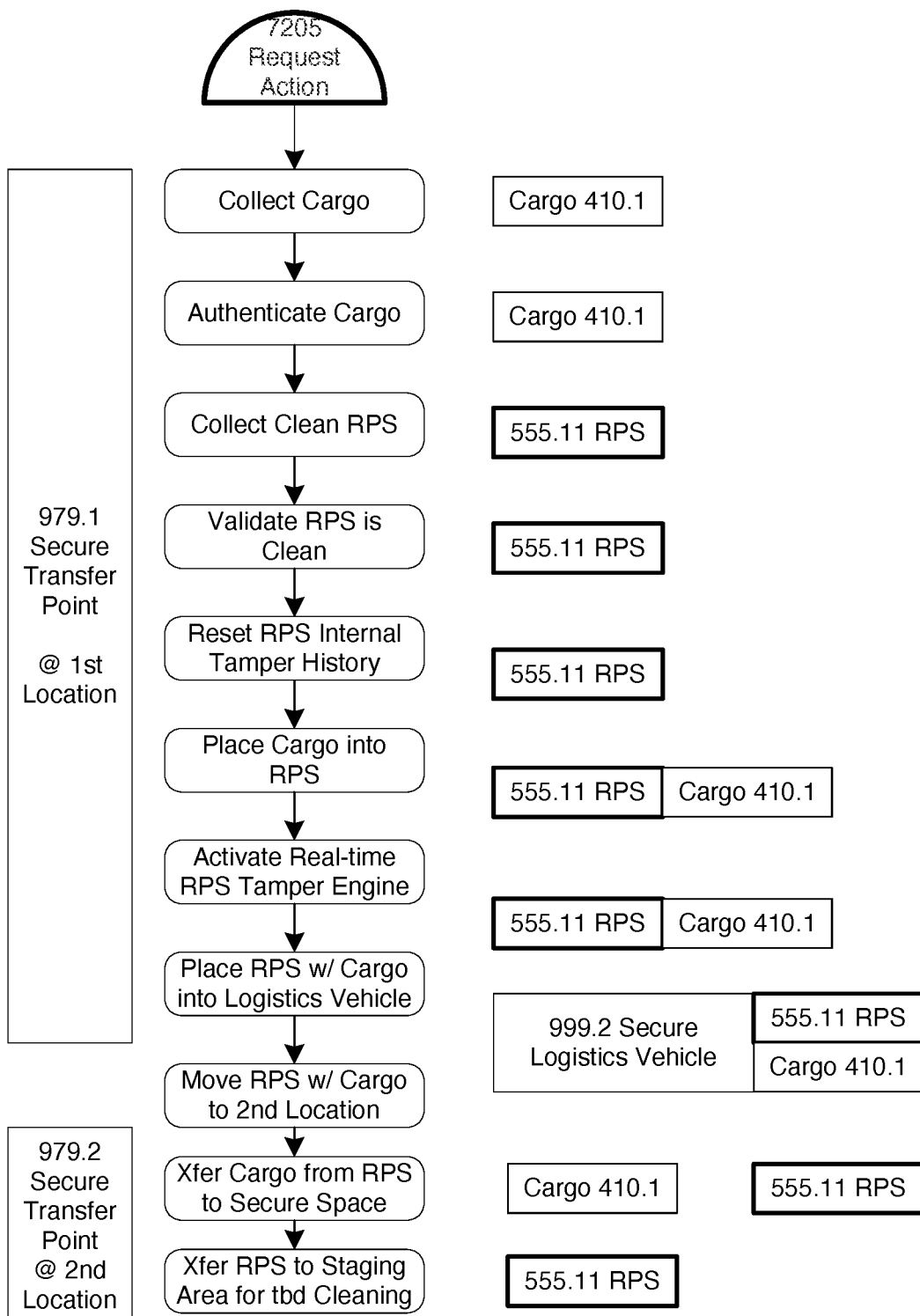
FIG. 7 is a process logic flow diagram of the controller depicting the wireless power system of a returnable packaging system within a secure environment.

Turning to FIG. 7, FIG. 7 is a process logic flow diagram indicative of the following instance. This exemplary instance is such that the transfer of the container/storage items occurs within a secure zone such that the authentication or adulteration status changes while within the secure zone yet the status determination occurs following the transfer, therefore the container/storage items would otherwise appear as tampered when in reality it should accurately be viewed as non-adulterated since there is certainty associated with the transfer having taken place within the secure zone. The first action is to request action 7205 to determine whether or not a container/storage item has been adulterated or altered in any manner detrimental to the authentication of the item. It is imperative that the item (i.e., cargo) be within secure zones at all times and when not within the secure zone the cargo must have onboard sensor(s) to ensure no tampering took place. The request action begins at the collecting of cargo (secure transfer point 979.1) where the cargo is authenticated at that same location. The system then collects a clean returnable packaging system "RPS" that occurs within the same secure location which then becomes a validated container (i.e., the system knows that the RPS is actually clean therefore would not contaminate the cargo leading to adulteration of the cargo) by way of validating the RPS is clean (typically through inspection sensors or camera, or intimate process confirmation). The RPS then has its internal tamper history reset immediately prior to the cargo being placed into the RPS (therefore it is assumed that the RPS is "mated" with Cargo). After such time the real-time RPS tamper engine is activated such that each occurrence of an authentication disturbance is written into the real-time RPS tamper engine. In this instance the mated RPS with Cargo is subsequently placed into a logistics vehicle while all of the components RPS with Cargo and logistics vehicle are within the secure transfer point 979.1 now collectively as a mated RPS with Cargo with Logistics Vehicle such that as the Logistics' Vehicle leaves the $1^{st}$ location Secure Transfer Point 979.1 the Logistics Vehicle itself as it moves is now considered a secure logistics vehicle 999.2. In this instance the mated RPS with Cargo is offloaded from the Logistics' Vehicle in a non-secure location such that the onboard sensors of the mated RPS with Cargo is critical to validating that the Cargo is not now tampered with. Subsequently, the Cargo is removed from the RPS at a now secure transfer point 979.2. The Cargo is now "unmated" with the RPS and the then unmated RPS is staged to an area for subsequent cleaning at a later date/time.

Figure 8:
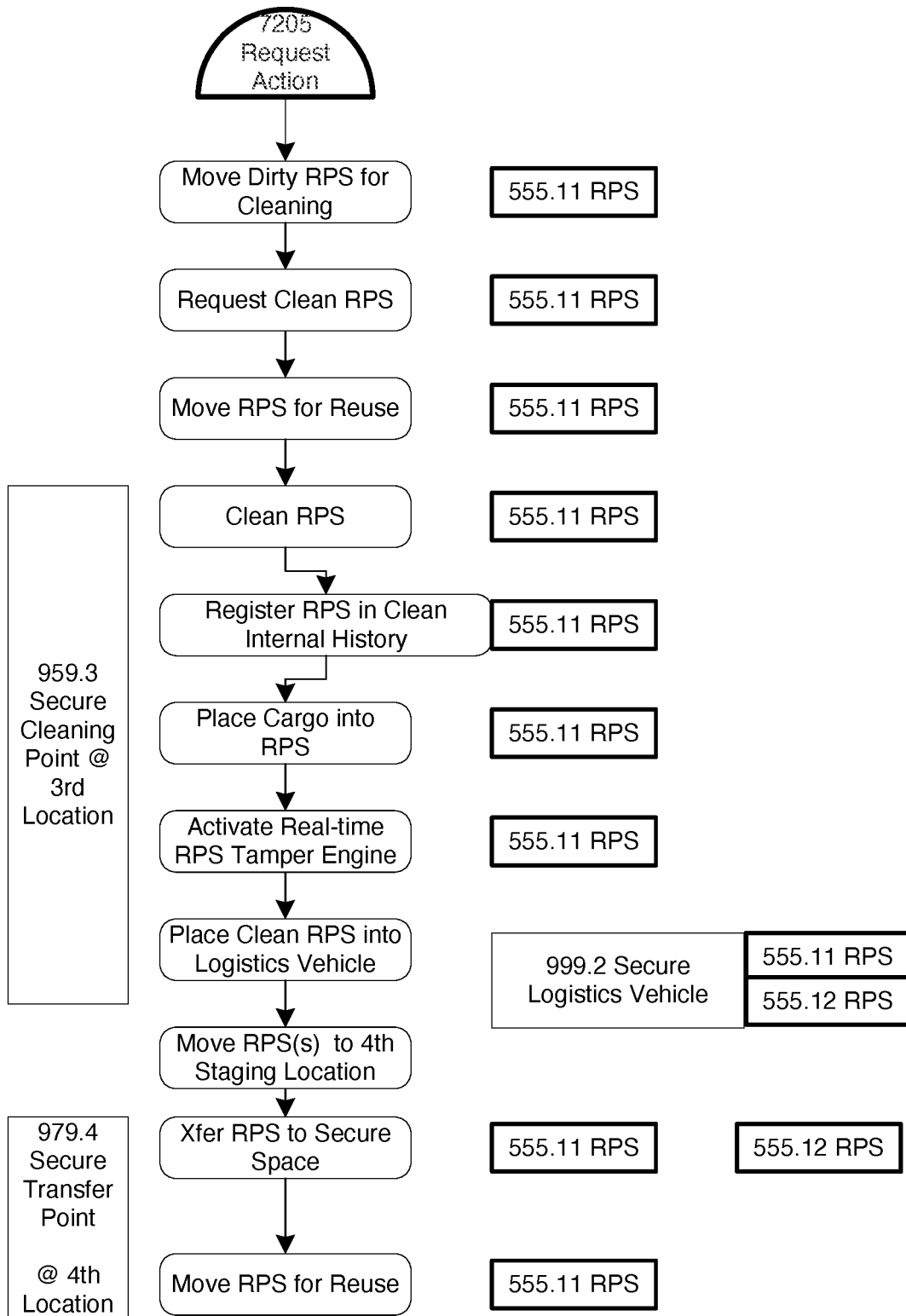
FIG. 8 is a process logic flow diagram of the controller depicting the wireless power system of a returnable packaging system within the cleaning environment.

Turning to FIG. 8, FIG. 8 depicts the scenario in which the RPS is being secured as being clean following the actual cleaning of the RPS. In this instance the request action 7205 begins the process for securing the movement of a dirty RPS to be queued for cleaning. The request to clean is being made to trigger the movement of the dirty RPS at the secure location 959.3. The RPS is then registered within the clean internal history. Cargo is then placed into the RPS and subsequently the real-time tamper engine is activated, then the Cargo is placed into a Logistics' Vehicle all while still in the secure location 959.3. The Cargo is within the RPS and now collectively mated with the Logistics' Vehicle. As noted in FIG. 7, this also has the mated Logistics' Vehicle with Cargo and then clean RPS is moved as a secure vehicle 999.2 and then the mated Cargo and RPS is placed into a secure transfer point 979.4 for decoupling the RPS into that secure transfer point 979.4 as a storage buffer point. The RPS is then moved to a new location outside of the secure transfer point 979.4.

Figure 9:
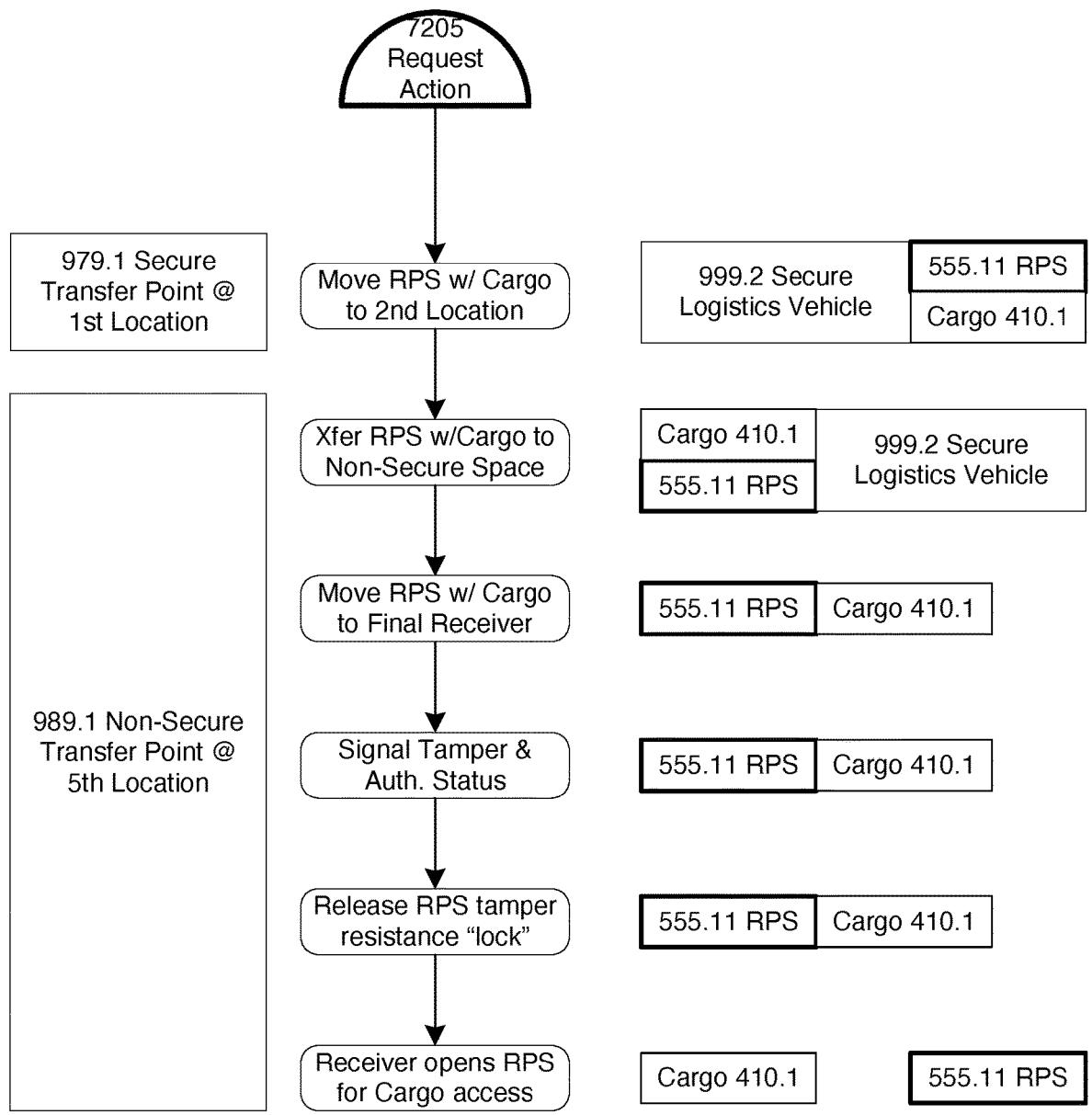
FIG. 9 is a process logic flow diagram of the controller depicting the wireless power system of a returnable packaging system within a non-secure environment.

Turning to FIG. 9, FIG. 9 is a process flow for the use case where cargo is decoupled from a logistics' vehicle and the accompanying RPS largely in a non-secure transfer location. The action is initiated by request action 7205 when a verifiable secure logistics' vehicle containing a Cargo 410.1 further contained within an RPS 555.11 arrives at secure transfer point 979.1 where the "mated" RPS with Cargo is removed from the logistics' vehicle to be transported to a second location. The mated RPS and Cargo are transferred to a non-secure space by the logistics' vehicle such that the RPS and Cargo are now external of the logistics' vehicle. Therefore, it remains imperative that the inventive system continues to monitor authentication or adulteration status through the preferably feedforward tamper control system. The RPS and Cargo is subsequently moved to the location of its final receiver (e.g., consumer or $3^{rd}$ party that takes responsibility for subsequent authentication or adulteration control). The system continues to monitor the tamper and authentication status for the RPS containing the Cargo. The act of removing the Cargo from the RPS releases the RPS' tamper resistance lock at which time at least one of the onboard controllers for the RPS timestamps a tamper event or the final receiver is communicated by the onboard controller the RPS timestamp of this tamper event along with any additional tamper events that may have occurred with their respective timestamp. The feedforward control system utilizes all of the tamper events with their respective timestamp to determine retroactively the probability of non-authenticated tampering to have taken place which is a combination of historic records, real-time status, as well as the now current prediction of forward looking events based on the Cargo's known or predicted final location/destination in which the final receiver is to receive control of the Cargo at which time the RPS is un-mated with the Cargo. The inventive feedforward system is required to recognize accurately the authentication and/or adulteration status of the container/storage items (i.e., Cargo) as a feedback system would indicate a tamper event due to the indicative change in authentication/tamper evident sensor at any time in which the Cargo was removed from the RPS irrespective of that transfer taking place within a secure or non-secure transfer location. A particularly desired use of the RPS is to avoid the use of non-environmental single use cardboard box where the cardboard box not only provides shipping protection of the enclosed cargo but is also a visual indicator (though imperfect at best) of whether or not the cardboard box was opened or damaged. It is a primary objective of the RPS and the inventive feedforward control system to transfer the Cargo out of the RPS, where the RPS provides physical protection during the transport of the Cargo from a 1$^{st}$ fulfillment location to a final consuming (or dispatching) location yet after such time as needing physical protection the Cargo is removed from the RPS such that ideally the Cargo remains in relatively thin (or at least 90% less mass bag or containment device as compared to a cardboard box or other containment device that also must provide physical protection). In order for the final consumer to be confident of no tampering having taken place the feedforward control system must take into account each tamper event with its respective timestamp, location, etc. as a simple feedback control system will depict a tamper event during the prior transfer of the Cargo out of the RPS into its then delivered state without the RPS.

Figure 10:
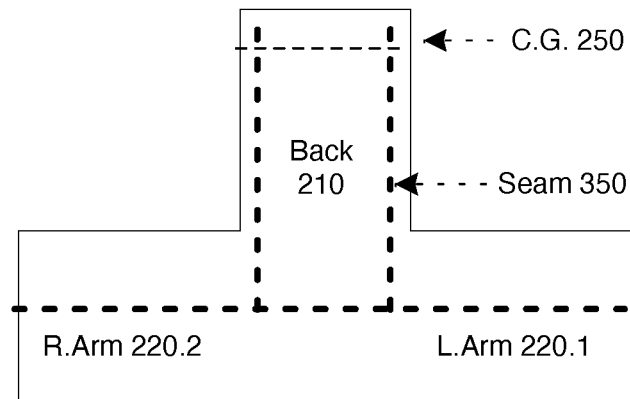
FIG. 10 is a top view of the wireless power system within a smart comfort clothing environment.
Figure 10:
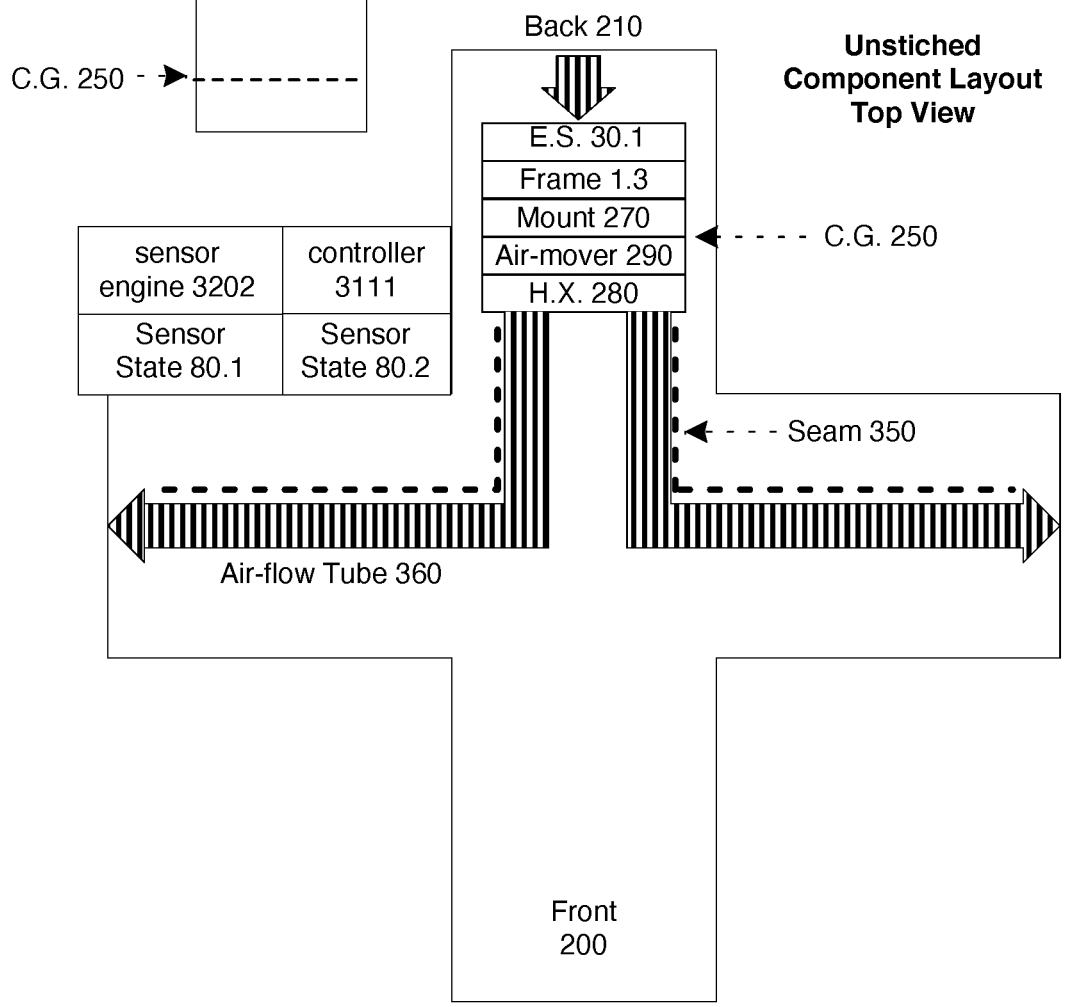

Turning to FIG. 10, FIG. 10 depicts the wireless power device in the form of smart clothing, which can include virtually any object that envelopes its host in full or partial coverage (person or animal). The specific depiction is for an object that goes over the torso of a person with the understanding that it is exemplary of covering other body parts. The object as depicted is a T-shirt that has a back 210, a front 200, a right arm 220.2 and a left arm 220.1 segment (which can be stitched together, or in fact a continuous textile that has been cut to encompass the back, front, and both arms in one piece (or any combination of individual pieces stitched together to cover those body parts). It is an objective of the invention to have a center of gravity towards the lower portion of the torso. In this instance the energy storage device 30.1 is shown to be on the back segment, such as desirable when the person will be performing physical activity especially relevant in a contact sport such as hockey or football. The placement of the energy storage device on the back limits the injury probability associated with relatively hard impact of the energy storage device 30.1 into the torso. A further inventive feature utilizes the seam area 350 for internal transfer of thermal energy from a first body portion to a second body portion. This thermal spreading improves comfort of the host person and in many instances significantly reduces by at least 5% (and preferably by at least 20%) the energy requirements to provide the host person comfort as high degrees of physical activity do not lead to homogeneous thermal production. In other words excess body heat produced during physical activity does not translate to the necessity to heat up a person's extremities (e.g., arms, hands, feet, etc.) and therefore thermal spreading from the torso (notably the top portion) to the extremities will reduce the amount of power required to provide comfort.

The T-Shirt also has a front center of gravity that may be distinct from the back center of gravity. The preferred embodiment has the energy storage device 30.1 on the backside that is in physical communication to a frame 1.3 that is then further in physical communication to a mount 270. The particularly preferred device further contains an air mover 290 to circulate exterior air via a heat exchanger 280 so as to do air to air heat recovery as a means to further reduce the energy demand from the energy storage device 30.1. It is particularly important that excessive internal humidity levels are the leading cause of discomfort to a much greater extent than temperature. The T-shirt further contains a controller 3111 with at least one sensor input providing a state point 80.1 (such as host temperature). A preferred embodiment has multiple onboard sensors such as internal relative humidity, internal air temperature. It is understood that the controller using known in the art wireless communication means can utilize external sensors to determine external relative humidity, an important aspect of the control logic utilized by the sensor engine 3202. The T-shirt utilizes the seams also to contain an air-flow tube 360 to further enhance the thermal spreading and provision of fresh air (though preferably after the air-to-air heat exchange) while minimizing discomfort to the host person. The placement of the air-flow tube within the clothing seams is an important feature of the invention. It is further understood that an external system, though not shown, to provide real-time location of the host person can be utilized preferably in combination with machine learning software to predict that temperature of the host (by calculating physical activity exerted in combination with real-time monitoring of external temperature and humidity). The use of machine learning increases the accuracy of physical activity measurement and its impact on comfort. Further, advance knowledge of the next physical activity (e.g., a coach knowing what play will be called) enables the inventive feedforward system to modulate thermal mass in anticipation of that physical activity therefore reducing the lag in renewing a comfort level.

A significant embodiment of the invention is the utilization of wireless power with integral energy storage to provide comfort to a host object (which is described as a person, though it is anticipated that it can be virtually any animate object requiring a modified sub-climate relative to the natural environment, hereinafter referred to as a microclimate). Contrary to monitoring or very intermittent power-using activities, thermal management requires significant amounts of power, yet it is highly desirable to minimize the incremental weight of components being carried by the host especially when the host object is performing physical activity. Therefore, maximum comfort must occur within the context of energy efficiency. Furthermore, in most instances where physical activity takes place, the issue of comfort is largely thermal management rather than creating heat even when the natural environment is greater than 30 degrees Fahrenheit from the normal host temperature. In fact, the most important aspect of comfort across all temperature differentials is humidity control and the most efficient method to reduce humidity within the microclimate is to utilize a heat exchanger having enhanced condensation coating to reduce the temperature differential required to dehumidify the air within the microclimate. In addition, particularly in conditions of high physical activity, the host object experiences significant variation of both sweat and thermal emissivity throughout the host object. The utilization of the energy spreading, in this instance being thermal spreading, enables thermal energy transfer from relatively hotter regions in the body to relatively cooler regions (i.e., extremities such as arms and legs relative to the torso) through the same energy spreader that is in thermal communication with a solid-state electrical to thermal conversion device (preferably a piezoelectric or Peltier cooling device that has both concurrent heating and cooling capability, which is critical for the dehumidification requirement). In many instances of physical activity, and in fact the most relevant to this invention, the activity is intermittent including intermittent exposure to wireless power through the integrated wireless power receiver. Furthermore, many of these instances in which the host object is within operational range of the wireless transmitter is actually accompanied by additional host objects therefore presenting a real-time decision as to how to proportionate an at least one wireless power transmitter to multiple wireless power receivers for the respective multiple host objects. The inventive use of the feedforward control in combination with the feedback control of the wireless receiver establishes the proportionate allocation substantially different than solely a feedback control of the wireless receiver such that the power allocation is at least 5% different between the combination of feedforward with feedback control as compared to just feedback control (and preferably at least 20% differential, and particularly preferred at least 50%) as a function beyond the current onboard energy storage level. The feedforward control utilizes at least one of the following to vary the otherwise feedback control: 1) projected or known level of future physical activity both in terms of absolute levels as well as relative levels as compared to the multiple host objects on a per wireless power transmitter basis, 2) differential of power demands based on #1 to ability of energy stored in the host's energy storage device and projected deficiency, 3) #2 further taking into account projected subsequent interactions with either the same wireless power transmitter for receipt of energy via wireless power pathway or a different set of wireless power transmitter(s), 4) prioritization based on impact of deficiency to meet power demands relative to multiple host objects on an overarching objective beyond the objectives of a single host object, and/or 5) fee-based prioritization relative ranking.

The combination of onboard energy storage and projected accessibility to wireless power transmitter for additional energy supply with comfort control based on both humidity and temperature of the microclimate and preferably also at least the differential of temperature within the microclimate of the host object to the exterior ambient environment yields an energy savings of at least 5% and therefore a reduction of size requirements for the onboard energy storage. The combination of the smaller onboard energy storage device, the placement of the bulk of the weight associated with the combined energy storage device with the balance of the high weight density components of the controlled device in closest proximity to the host object center of gravity and further placement in the back of the host object with more preferred location on the back of the torso that has the smallest amount of relative motion within the host object during the physical activity of the host object.

The controlled device placed as described above is in structural communication with the host objects clothing, whether that clothing be a jacket, a direct covering of the top of the host object body, a direct covering of the bottom of the host object, or a specialized covering to maximize the clothing interaction with the host object. The further integration such that the controlled device is in energy communication (whether it be thermal spreading or optical light spreading) with the clothing/covering in addition to structural communications.

The controlled device, particularly when condensation results from the use of an enhanced condensation coating within a heat exchanger to cool the air from within the microclimate, further includes a superhydrophobic coating on the discharge of the condensed water so as to reduce by at least 10% moisture migration within the covering (as compared to a discharge without the coating). Another embodiment is such that the condensed water is used within a counter-flow heat exchanger in which evaporative cooling is achieved using the condensed water of the ambient air so as to reduce further the energy consumption required in order to reduce the air temperature of the microclimate to further increase the levels of condensation for additional dehumidification of the air within the microclimate.

Comfort control is best achieved concurrently by regulating wireless power as a function of humidity level such that temperature differential across the exterior environment vs. the interior environment achieves energy savings, therefore enabling the energy storage to be smaller than without it. The further addition of an air to air heat exchanger (or an air to liquid heat exchanger using the condensed liquid) enables yet additional energy savings and again a further reduction of energy storage size in order to buffer the total energy required to fulfill the mission. An additional optional atomizer (or superhydrophobic "channel") to move away the condensed liquid (or can be a change in discharge air direction to move away the condensed liquid) away from the host wearing the "smart clothing" and particularly moving the condensed liquid also away from the smart clothing textile substrate. Using an air jet to pull in aft from the interior, and then for the air jet to push in air from the exterior into interior has a higher air mixing (the air jet also allows) ratio then without the air jet.

The utilization of both sides of the Peltier cooling (or other known in the art thermal management means including solid-state thermoelectric or non-preferred mechanical means including heat pump cycles as known in the art) decreases energy consumption and such that the Peltier's cooling side does dehumidification and the Peltier's heating side moves thermal energy to extremities in addition to the inherent enhanced homogenous thermal gradient due to the energy spreader. The preferred embodiment pulls humid air from the covering bottom on the back side (mounting on the heft of the host object), dehumidifies the air using enhanced condensation, reheats the air using the Peltier's hot side and pushes the air through a microblower (generically referred to as air mover) for entry into the hands region of the host object (when jacket, or feet when pants). When the humidity levels in the ambient exterior is less than the microclimate interior, the further use of an integrated air-to-air heat exchanger integral to the interior of the covering/jacket also preheats precook the fresh air. The heat exchanger is preferably a flexible heat exchanger integral to the clothing, and further preferably with the flexible heat exchanger within the interior space of the clothing.

The mounting of the controlled device is preferably such that at least 80% of the weight of the controlled devices is within at most 6 inches of the structural mounting point between the controlled device and the host object center of gravity. More preferred is such that the mounting point is within at most 6 inches of center of gravity or placement on body portion having least relative motion during physical activity exertion. Importantly the mounting of the controlled device maintains freedom of movement of the host object clothing (by at least 2 inches) without impeding the flow of energy through the energy spreader and/or air movement to the clothing.

This capability enables super-drying of the microclimate air immediately prior to peak activity levels anticipating that a high level of humidity is produced and that excess heat will be produced (and when it is a winter activity, i.e., cold outside) the most important issue post-peak activity is one of dehumidifying the microclimate to maintain comfort as adequate heat will be available. If anything, the excess heat will need to be moved to extremities away from the body following the dehumidification of the air.

A further feature of the preferred embodiment has transport of air movement from one portion of the host object body to another portion of the body predominantly through a hollow tube where the hollow tube is in line with at least one seam of the clothing, and preferably such that the hollow tube is also structurally bonded between individual segments of the clothing and the tube therefore providing the combination of superior air flow and air distribution with the tube providing additional surface area for superior bonding of the clothing segments through the hollow tube.

The preferred embodiment of the comfort clothing further includes an electromagnetic shield such that the wireless power then has reduced penetration into the host object. The particularly preferred embodiment is such that the energy spreader is also an electromagnetic shield "EMF". It is understood that the EMF also shields radio frequency transmissions including from the wireless power transmitter especially when the wireless power transmitter provides steerable or directionally controlled power. The preferred mounting placement closest to the hosting object center of gravity (i.e., waist area) when it is a human being happens to also be the safest place, relative to the head. This position is inherently the best placement especially when the host object is sitting such that wireless power transmitted is embedded in the seat-back portion of a chair which has its energy storage also serving as ballast. The particularly preferred wireless power receiver is capable of being nested with each other and further includes an electrical continuity pathway whether this be wired or short-range wireless power (i.e., less than 1 foot, and particularly preferred less than 6 inches).

Other anticipated embodiments that are virtually identical as clothing include shoes as well as ski boots such that the wireless transmitter is preferably embedded in or near the floor especially when sitting. The sitting can take place when riding a ski lift, riding a golf cart, when on or near a team bench. Another embodiment is where clothing is replaced by sheets (or other coverings) within a bed for personal comfort.

Another anticipated embodiment analogous to the RPS includes devices that have similar temperature sensitivity during usage and/or cleaning including cutting board, cutting utensils, condiment containers, salt and pepper shakers, serving utensils, water pitchers, etc. Most of these instances benefit from having nominal onboard power to provide indication of potential pathogen contamination and termination of a cleaning or disinfecting cycle to address the potential pathogen contamination. Methods of disinfecting include circulating fluids containing chlorine dioxide or peracetic acid or essential oils as well as other known antimicrobial or disinfectant actives, to localized production of ozone, ion cold plasma, or even surface charges to adversely impact the potential for pathogens to cause cross-contamination. In fact, other additional host objects including table surfaces, sinks, sink drains, sink handles, door handles, keyboards, kiosk touch displays or keypads, etc. all are anticipated as beneficiaries of the inventive controlled device.

Yet additional embodiments include waterproof fixtures or appliances with exemplary instances of a blender with an embedded motor and a blade higher up or preferably a variable height blade. A mixer gains similar inventive features as well. Cutting boards or cutting utensils (or shared utensils such as in a salad bar) leverage the wireless power capabilities through active disinfecting methods as known in the art. An inductive heating device including pots and pans, preferably with anti-stick coating having an upper temperature limit (therefore needing external control to limit heating levels below a coating threshold temperature) is another embodiment. A further embodiment of external control is the external (i.e., not integral to the inductive heating element) communications such as required to make the inductive heating device a child-proof stove. Another inventive feature is a super insulated cooking ware such that the integral heating element is thermally isolated from the exterior portion of the cooking ware. A particularly preferred embodiment is where the inductive heating element is capable of rotating such that heat transfer is significantly enhanced for more rapid liquid heating. Yet another embodiment is an instantaneous water heater also gaining from the inventive features.

Other embodiments include a wall "trim" having an integral bus bar with moveable wireless power receiving "pads", preferably using magnets to move along the wall trim for effective electrical communications with the integral bus bas. It is particularly preferred such that the integral bus bas has real-time sensing of when the respective power consuming device is engaged. These features are also inventive for furniture such as tables, furniture with shelves as well the respective electrically consuming (i.e., entertainment) equipment that is in structural communications with the shelves. A particularly preferred embodiment is such that the integral bus bar is multifunctional such that it also provides structural communications to each of the respective shelves.

Other devices that leverage the inventive features are notably light fixtures that have integral light guides including light fixtures having nantenna or metalens to re-direct the light being powered by the wireless power. The inventive wireless power device can also be empowered to become a safety device such that if the safety device moves a specified distance away from the wireless receiver it turns off. Such a feature is particularly deeded in commercial and industrial lighting where the system learns a proper distance in which such a safety feature is necessary.

Yet another embodiment is a mobile vehicle, including and notably a bicycle, motorcycle, skateboard, or scooter, where the passenger has active clothing which can include a helmet. The passenger has a wireless power receiver such that the electricity consuming device is in electrical communications with the mobile vehicle through its active clothing (that can also include wireless power receiving shoes in electrical communication with an energy storage device that is in structural communications with the passenger, such as a belt mounted energy storage device. This embodiment greatly reduces the cost (and physical size) of the energy consuming device, can enable specific pairing of the device between a wireless power transmitter and receiver therefore limiting the value of the energy consuming device if it is stolen from the mobile vehicle. These benefits are virtually identical for a hearing aid, an electric guitar, etc.

The benefits of insulating through wireless power transmission for the aforementioned inductive heating element is virtually identical for cooling such as a cooler having power coming via solar mechanism, as known in the art, on top of the cooler such that wireless power transmitter on the backside of the solar mechanism transmits power to an active cooling device (e.g., thermoelectric, compressor) internal of the cooler such that thermal losses are minimized. A particularly preferred device is coated with an icephobic coating such that thermal requirements to remove any formed ice is thermally isolated (by at least 90% of energy going into the ice-forming side of the coated surface).

Yet another embodiment is such that an actuator obtains power by the user/device that engages with the actuator at the time of actuation. The preferred actuator is in the non-powered state except for actual times in which the user/device requires a change of state; therefore, the user/device is responsible for delivering power. Such embodiments include devices ranging from gun safety for police, etc., use actuated latch to enable battery switching in an ASRS shuttle, in tube valves and sensors, sports ball for tracking or visual display, containers used in food (or pharma) manufacturing, such that an entire circuit from power to functionality has greatly reduced clean in place temperatures through the entire clean in place process by using phase-change-material that is cooled during all other operations except for CIP.

Figure 11:
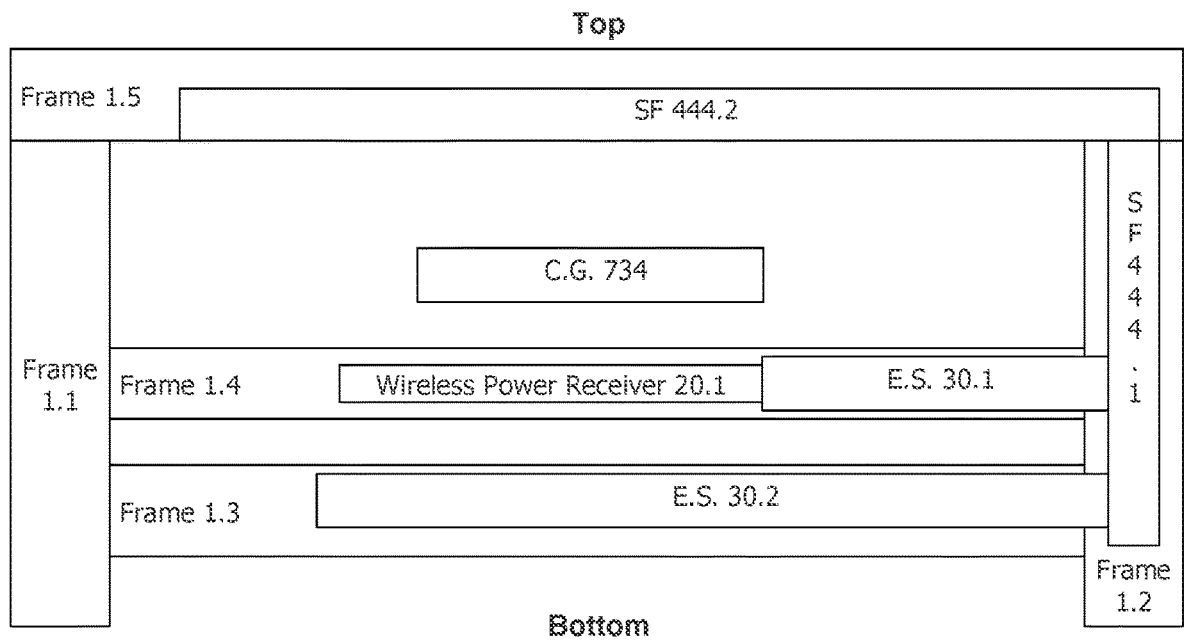
FIG. 11 is a side view of the wireless power system with integral energy storage embodied as a structural component in which the energy storage lowers the center of gravity and leverages multi-functional structural foam for both energy storage outgassing adsorption and structural integrity.

Turning to FIG. 11, FIG. 11 depicts a side view of another embodiment of the distributed decentralized energy storage leveraging the capabilities of wireless power transmission, or simply energy being transmitted via low voltage wired power transmission. An inherent problem with distributed decentralized energy storage centers around failure modes associated with certain types of battery chemistry within the energy storage, notably lithium ion battery types. Failure modes are accompanied in some instances with outgassing from the energy storage device such that the gas being outgassed into the host environment would be further detrimental to the health or safety of any occupants in close proximity to that failing energy storage device. The inventive solution to reduce the exposure to gas being outgassed from the energy storage system is the multi-functional use of a structural foam 444.1 where the structural foam 444.1 serves as a structural element of the host device (e.g., tabletop as shown by structural foam 444.2). The further use of at least two structural foam elements in both structural communications with each other and gas transmission pathway communications increases the total adsorption capacity of the outgassing gas such that the energy storage device 30.1 outgassing gas transmission pathway is also in communications with the structural foam. The structural foam is in structural communications with at least one frame element. A further inventive feature is such that the energy storage device 30.1, having an optional wireless power receiver 20.1 embedded into the at least one frame element 1.4 such that the frame element is also in thermal communications with the energy storage 30.2. The utilization of the frame element as a thermal spreader further enhances the energy storage performance by reducing battery internal temperature therefore reducing the probability of thermal runaway by at least 5% as compared to an entirely self-contained energy storage device. The significant increase in external surface area by leveraging the thermal spreading capability of both the frame element(s) and the structural foam component(s) reduces the thermal runaway by at least 25%. As depicted in this figure, the energy storage device 30.1 optionally receives electricity via the wireless power transmitter 25.1 to the wireless power receiver 20.1 (which can also be achieved via a wired means and therefore preferably a low voltage (i.e., less than 48 VDC) wire embedded into the same host device. The energy storage device(s) are preferably towards the bottom of the host device so as to lower the center of gravity 734 of the host device. The particularly preferred embodiment has essentially all of the structural elements, especially when these structural elements have sufficient thermal conductivity to become an effective thermal spreader. As depicted, energy storage device 30.2 is in thermal communications with structural frame element 1.2, 1.3, 1.4, 1.1, 1.5 and also structural foam 444.1 and 444.2.

Figure 12:
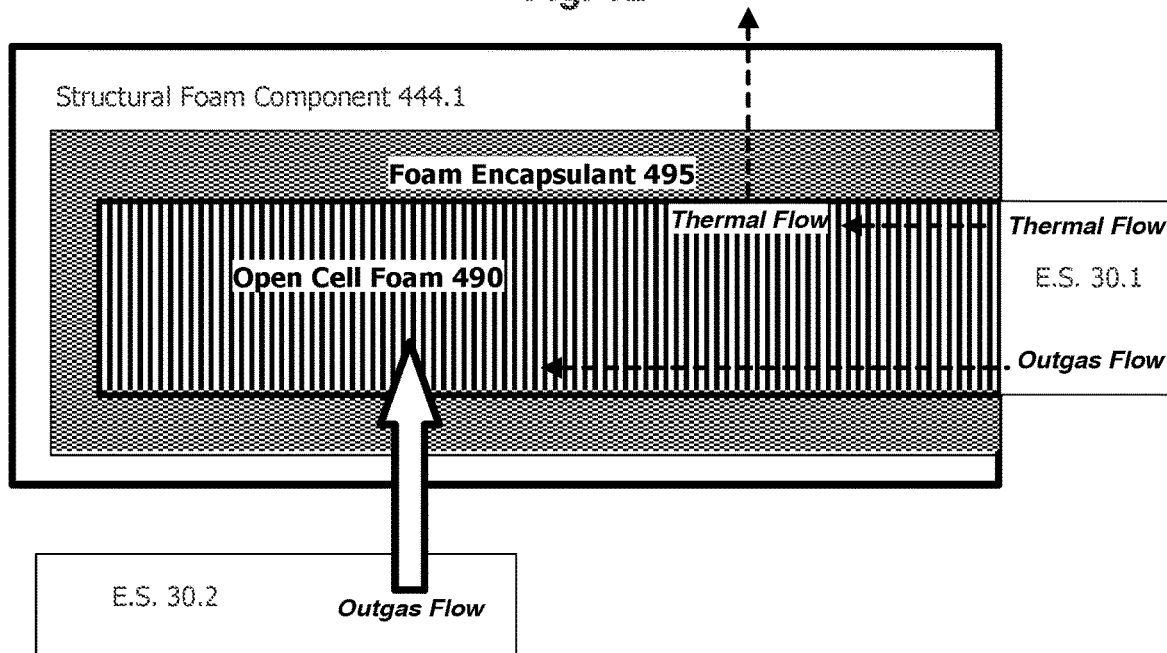
FIG. 12 is a side view of the structural foam component further depicting the multi-functional nature in more detail.

Turning to FIG. 12, FIG. 12 depicts a detailed cross-sectional view of the interior of the structural foam component 444.1. The ideal configuration is such that the structural foam component 444.1 has an encapsulant 495 such that gas being outgassed from the energy storage device is contained within the structural foam component 444.1. The goal of the encapsulant 495 is to eliminate a gas transmission pathway into the ambient environment. The interior of the structural foam component 444.1 is preferably an open cell foam 490 such that the foam has a very high surface area for enhanced gas adsorption with the open cell foam nature providing a continuous pathway for the outgassed gas to maximize diffusion into the foam such as depicted from energy storage 30.2. The thermal spreading is preferably achieved by direct thermal communications with the energy storage device, as depicted 30.1, with further propagation into the open cell foam 490 element with yet further thermal continuity through the exterior portion of the foam encapsulant 495. Though not shown, the inclusion of graphene within the open cell foam enhances gas adsorption as well as thermal spreading and therefore is a superior embodiment of the structural foam component.

The following figures are further details of a particularly preferred embodiment for aforementioned containers/storage items within a logistics distribution system. The embodiment of the wireless power is best realized when the containers/storage items have the further means to maintain validated methods to prevent adulteration of the items even when the containers/storage items have wireless power means of indicating when/if such an adulteration takes place. The following additional inventive features takes fundamental steps to prevent adulteration from taking place and therefore becomes an active deterrent mechanism. The combination of the wireless power features and the following logistics transfer mechanism is the optimal embodiment of the invention. In fact, the logistics transfer mechanism is in fact an ideal user of wireless power such that the actuator/motor required to move the counter-rotating closure cover, hereinafter referred to as C.R.C. from its closed position to the correctly located opening/gap position with the correct length of the opening/gap reduces the requirement to power the rails directly, or to use lower voltage cable with lower power ratings such that any integral bus bar has substantially lower cost.

It is however understood that the inventive figures as shown from FIG. 13 through FIG. 17 can be implemented without any of the aforementioned FIG. 1 through FIG. 12.

Figure 13:
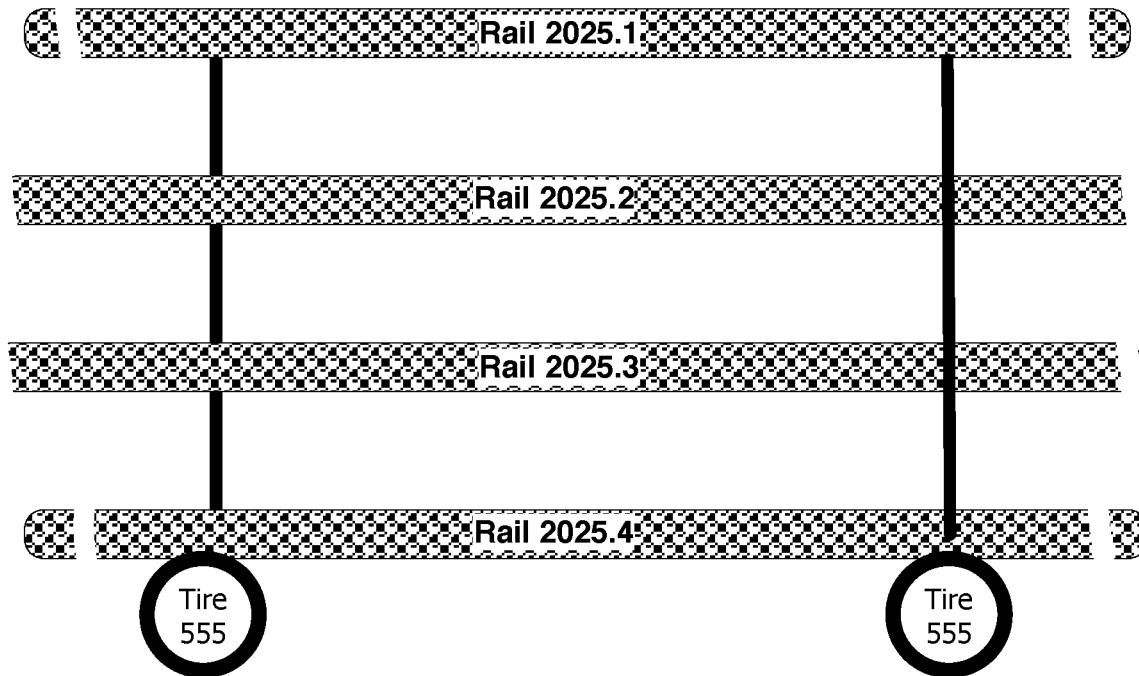
FIG. 13 is depicting two scenarios of side views also of a storage containing device having at least two counter-rotating closures where interior rails are movable vertically.
Figure 13:
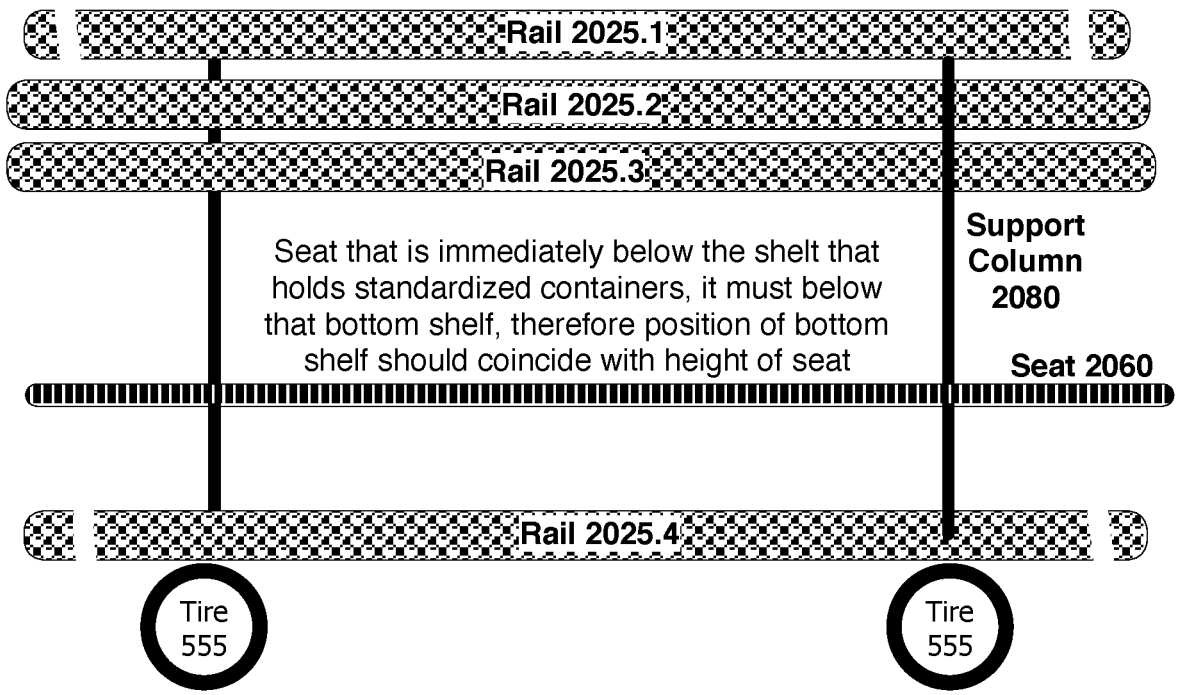

Turning to FIG. 13, FIG. 13 has two side views with Scenario A depicting the individual levels in their fully deployed mode in which the host vehicle (having tires 555) for movement from an at least first location to a second location such that at least one of the locations is where containers/storage items are placed into the vehicle device and a second location of the at least one of the locations is where the containers/storage items are individually removed in a secure manner so as to prevent any adulteration of the contents from taking place, each having their respective rails in which the C.R.C.s travel. The particularly preferred embodiment has the vehicle device capable of changing from a logistics mode to a secondary mode (e.g., passenger mode, a non-logistics mode such that at least a portion of the interior space of the vehicle device becomes not used for movement of containers/storage items from a first location to a second location). The vehicle device has at least two rail sections in which a C.R.C. is in structural communications and such that an opening/gap occurs by the respective movement of an at least one end of the C.R.C. takes place where the C.R.C. is always in structural communications with the at least two rail sections and the C.R.C. opening/gap limits by length of the gap (i.e., gap distance between the C.R.C.) so as to enable a first container/storage item to be removed from the vehicle device without creating access to a second container/storage item on the vehicle device not authorized for concurrent access (especially on the same level). The C.R.C. is always in structural communications (as shown here to be a top rail and a bottom rail) with a first rail section 2025.1 and a second rail section 2025.2. Additional levels are anticipated as shown in their respective pairs to be first rail section 2025.2 with second rail section 2025.3, and first rail section 2025.3 with second rail section 2025.4. In this embodiment, as known in the art, the intermediate levels (i.e., not creating the exterior of the vehicle device) are capable of being lifted so as to create physical space for a secondary function (e.g., passenger carrying mode) as a method to increase vehicle device utilization. The preferred embodiment, as shown in Scenario B, leverages the support column(s) 2080 to both offer structural support to each level and its respective rail sections as well as providing structural support and communications between a seat level 2060 (comprised of at least one foldable seat section in structural communication with the seat level, though not shown in this figure). The particularly preferred embodiment has the support column also providing hand stability support to the vehicle device, as known in the art, for passengers that are standing. A further embodiment of the support column acting as the hand stability is further comprised of the wireless power receiver such that as aforementioned noted enables active disinfecting of the support column 2080 and/or visual indication of the state of disinfection to the passenger. The support column, though not shown in this figure, contains an energy storage device (such as to minimize the useable interior space of the vehicle device) and/or open cell foam structure for adsorption of outgassing gases from the energy storage device in gas communication between the support column 2080 and the energy storage device contained within the column.

Scenario B further depicts the intermediate levels (rail sections 2025.2 and 2025.3) in their vertically raised position so as to create passenger space below the now raised position and such that rail 2025.4 having either or both a fixed floor or sliding floor in which passengers stand on while using the vehicle device for non-logistics purposes. The seat 2060 must be below the lowest of the intermediate levels and its associated rail 2025.3 when the desire is to minimize the unused space when in logistics mode. It is understood that the seats can be in structural communication to the lowest rail (bottom 2025.4) of the vehicle device as an alternative such that the seats are in structural communication through the lowest rail to the vehicle device in which case the seat would raise to a useable position as known in the art.

Figure 14:
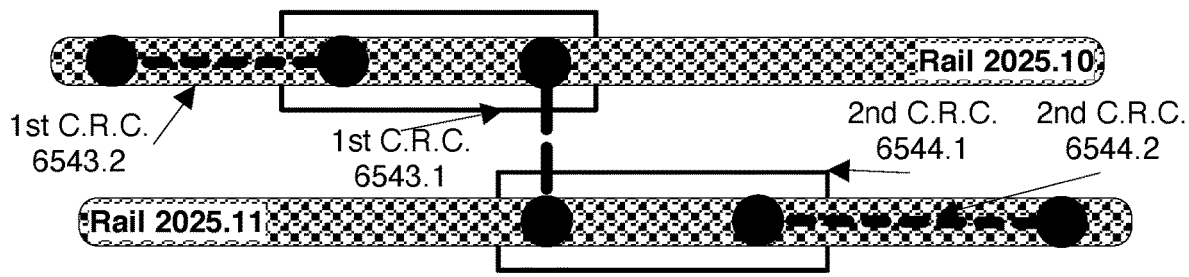
FIG. 14 is depicting another two scenarios of top views of a storage containing device having at least two counter-rotating closures, and another three scenarios of side views also of a storage containing device having at least two counter-rotating closures.
Figure 14:
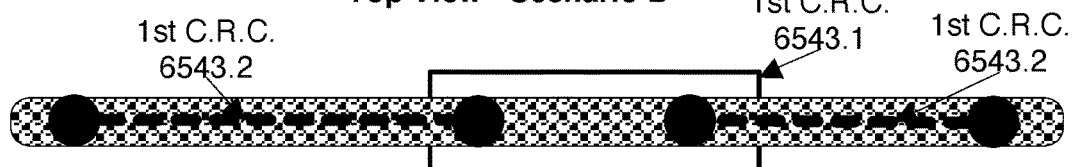
Figure 14:
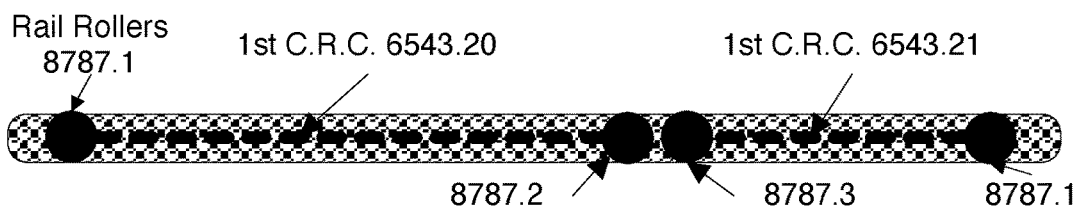
Figure 14:
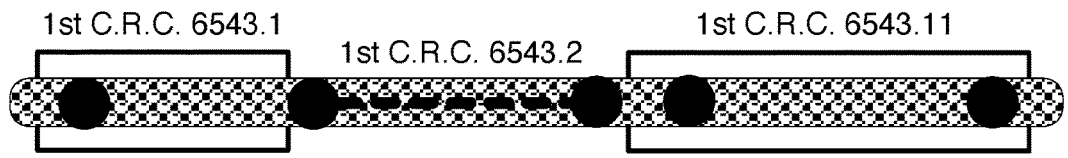
Figure 14:
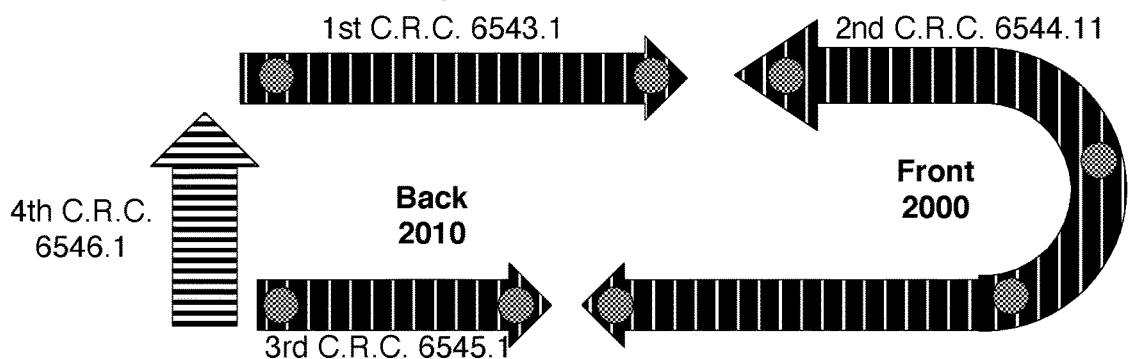

Turning to FIG. 14, FIG. 14 Scenario A is a top view where a rail in this instance is a rail assembly having an interior rail 2025.10 and an exterior rail 2025.11 such that the interior rail (actually can be vice versa) as depicted has roller bearings within the interior rail for the movement of the $1^{st}$ C.R.C. where $1^{st}$ C.R.C. 6543.2 is a cover closure that is capable of compressing in length (i.e., the ability for the C.R.C. to reduce in length whether it be by compressing such as a foam, folding inward such as a corrugated sheet collectively referred to as compressible portion of the cover closure) by at least 5% of its overall length (and preferably by at least 10% of its overall length, or even at least 20% of its overall length). The compressible cover closure "CCC", as depicted $1^{st}$ C.R.C. 6543.2 is in physical communication with the non-compressible cover closure $1^{st}$ C.R.C. 6543.1 such that movement of either 6543.2 or 6543.1 moves the other in the same direction along the interior rail. The exterior rail 2025.11 is in physical communications with the roller bearings (shown from other figures, as well as being the solid black balls) that are also in physical communications with the $2^{nd}$ C.R.C. in this instance also shown with a non-compressible portion 6544.1 and a compressible portion 6422.2.

Scenario B is also a top view of the interior rail (though the principle is identical for the exterior rail with the $2^{nd}$ C.R.C. as well) such that the $1^{st}$ C.R.C. has a first compressible portion 6543.2 adjoining in physical communications a non-compressible portion 6543.1 further adjoining a second compressible portion. It is understood that each of the C.R.C.s can have multiple compressible portions as well as multiple incompressible portions (and though shown as being in alternating sequence, and sequence can take place including multiple non-compressible portions with a compressible portion in between them. It is understood that the dash line in these instances represents the compressible portion whereas the outer rectangle of 6543.1 represents the non-compressible portion. It is also understood that each instance of the roller bearing orientation to the rail as shown in a top view can be repeated as a side view, in other words the side view has the roller bearings facing outward whereas the top view has the roller bearings facing upward (and its counter rail has the bearings facing downward).

Scenario C is a depiction of the rail having the rail rollers (a.k.a. roller bearings) 8787 adjoining to the $1^{st}$ C.R.C. 6543.20 and then in physical communications with a second portion 6543.21. The two adjoining portions may in fact be a single compressible portion in which the rail rollers 8787.1 on the furthest left portion and the "repeating" 8781 on the furthest right portion are actually the same rail roller bearing (in which case this would be on the other side of the vehicle device (containing the container or storage items). In this instance the opening/gap would occur anywhere along the rail but always be between rail roller bearings 8787.2 and 8787.3 such that each of the bearings 8787.2 and 8787.3 would have an independent motor/actuator for movement along the rail and that the C.R.C. would compress at least the equivalent amount of the desired opening/gap (that being at least 0.1% more than the width of the container or storage items for adequate clearance, though preferably at least 1% more, and particularly preferred at least 2% more). Though not shown, the furthest right bearing 8787.1 could be labeled 8787.4 for the instance as depicted as $2^{nd}$ C.R.C. 6544.11 in Scenario E where 8787.2 and 8787.3 remain in physical communications at all times and the bearing is solely exemplary of multiple bearings to ensure smooth movement of the C.R.C. It is understood that many more bearings are used then shown so as to ensure both efficient and effective movement of the C.R.C. along the rail and importantly also providing containment of the containers/storage items within the vehicle device (such as when acceleration, deceleration, crash, etc. takes place). It is recognized that the placement of the C.R.C. maximizes containment through the use of non-compressible portions of the C.R.C. and therefore the placement of the non-compressible portions of the C.R.C. are optimally located at the front 2000 and/or back 2010 (as shown in Scenario E) of the vehicle device during vehicle device movement since the likelihood of a crash occurs during movement and the resulting crash forces would be from vehicle device deceleration and impact of other vehicles either in front or behind the vehicle device. It is also understood that the compressible portion of the C.R.C. can have vertically oriented support beams spaced within the compressible portion of the C.R.C.

Scenario D is a depiction of the roller bearings in physical communications with a non-compressible C.R.C. 6543.1 to a compressible C.R.C. 6543.2 and then to a non-compressible C.R.C. 6543.11.

Scenario E is a depiction of device having at least two distinct dynamically placed openings (i.e., gaps for placement or removal of containers or stored items to/from the device) by the use of the roller bearings in physical communications. In order for the at least two distinct dynamically placed openings to be achieved the device must have at least three C.R.C. portions of which at least one of the C.R.C. has at least one compressible portions (6544.11). In this instance a first C.R.C. 6543.1 (has at least one compressible portion) with a motion mechanism (i.e., not depicted but understood to be a motor or actuator to change the length of the C.R.C. by at least the amount desired for opening a gap between the second C.R.C. 6544.11) by moving the end of first C.R.C. 6543.1 closest to the second C.R.C. 6544.11. An actuator/motor in this instance would also be on the end of second C.R.C. 6544.11 closest to the first C.R.C. 6543.1 as well. And further another actuator/motor is on the end of second C.R.C. 6544.11 closest to the third C.R.C. 6545.1 as well as yet another actuator/motor on the end of the third C.R.C. 6545.1 closest to the second C.R.C. 6544.11 in order to create the second opening/gap in the device. In this embodiment a $4^{th}$ C.R.C. 6546.1 is shown such that this C.R.C. is compressible to enable its length to change even when one side of the $4^{th}$ C.R.C. (the non-arrow side) is fixed. In this embodiment it is also anticipated that the non-arrow side of $1^{st}$ C.R.C. 6543.1 is fixed in position as well as the non-arrow side of the $3^{rd}$ C.R.C. 6545.1 though it then becomes more necessary to have a further degree of compressibility so as to enable the opening/gap to be closer the fixed end (i.e., at least 80% compressibility). It is anticipated that the $4^{th}$ C.R.C. 6546.1 will enable the Sliding Floor (4440 of FIG. 15, Scenario B) having on it multiple containers for rapid placement on or removal instead of needing to individually remove a container by moving the respective ends of the C.R.C. to create the appropriately located opening/gap. Though the Sliding Floor 4440 of FIG. 15 is anticipated to be removed/placed via the back end of the vehicle it equally can have such access on the front end of the vehicle as well.

Figure 15:
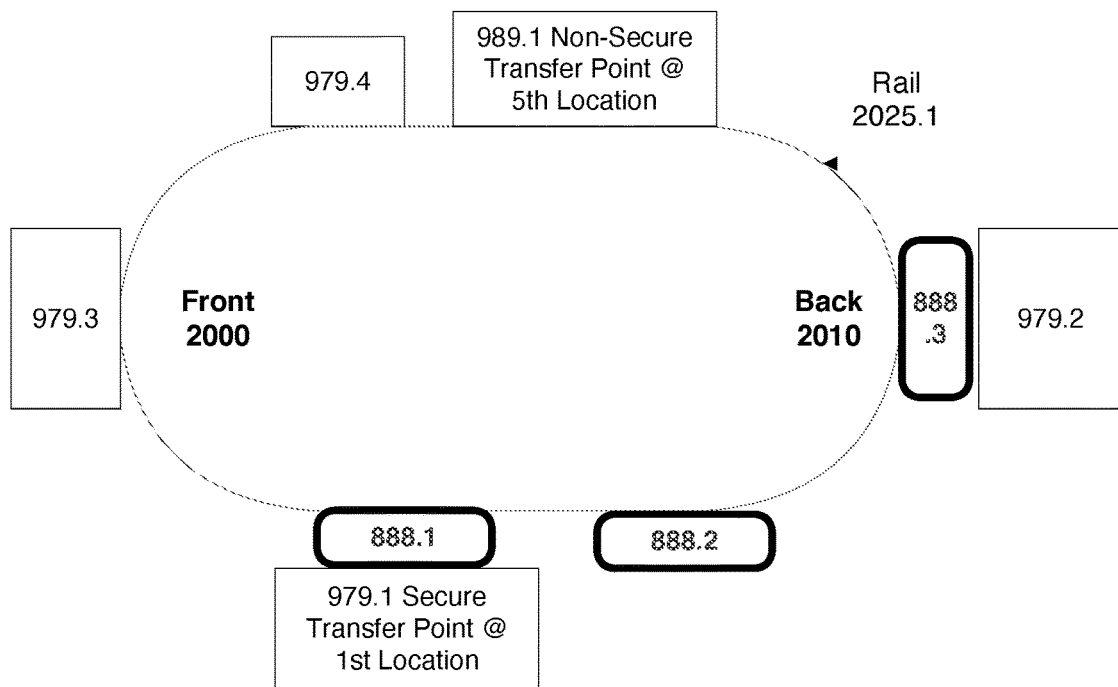
FIG. 15 is depicting two scenarios of top views also of a storage containing device having at least two counter-rotating closures with exemplary transfer points.
Figure 15:
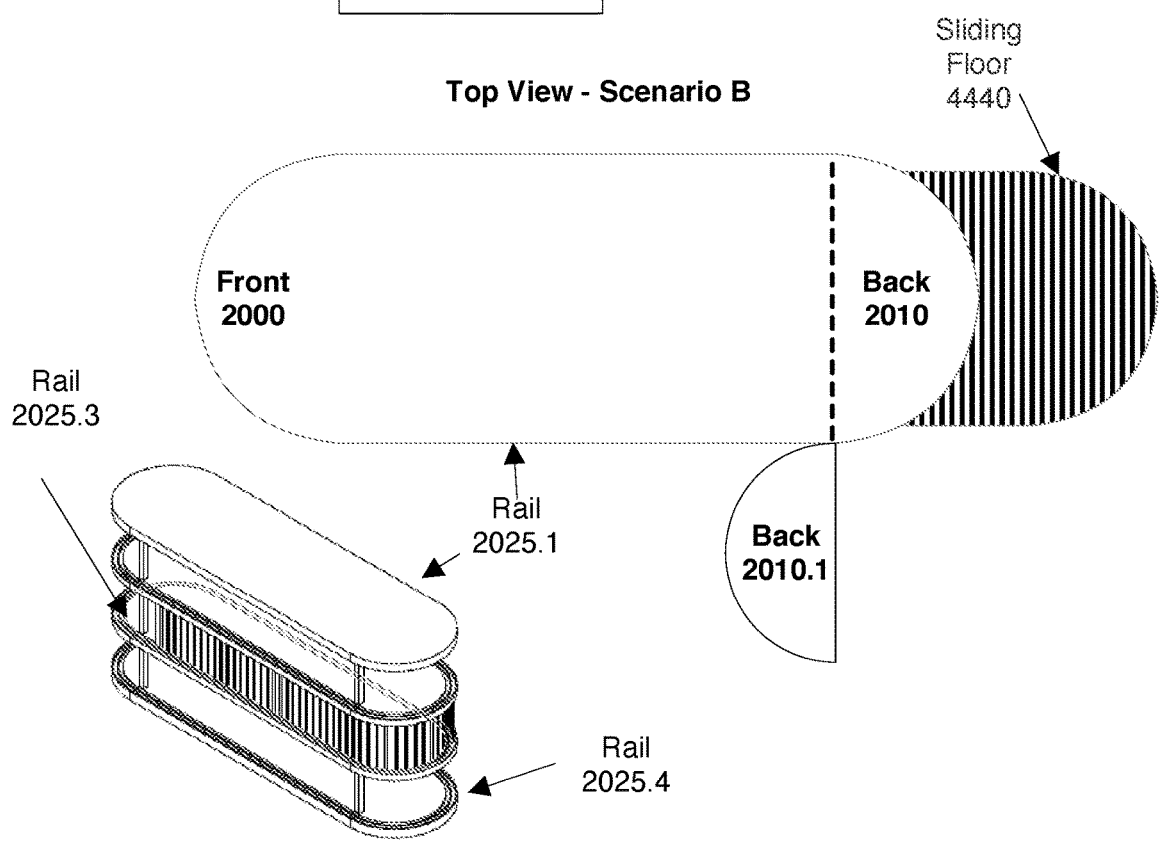

Turning to FIG. 15, FIG. 15 Scenario A is a top view of the vehicle device depicting additional instances of transference of containers/storage items from within the vehicle device to/from external of the vehicle device. A secure transfer docking mechanism 888, as known in the art, is an important aspect of the invention so as to provide 100% assurance of no adulteration to the containers/storage items when the vehicle device itself is not in a secure transfer location. The secure transfer docking mechanisms of 888.1, 888.2, and 888.3 align with the opening/gap created by positioning of the C.R.C. The docking mechanism instance 888.1 takes place at a secure transfer point at a $1^{st}$ location 979.1 as shown on the left side of the vehicle device. The docking mechanism instance 888.3 takes place at a secure transfer point at another location 979.2 as shown on the back side of the vehicle device. Other secure transfer points 979.3 and 979.4 are exemplary instances in which containers/storage items can be transferred to/from the vehicle device as uniquely enabled by the C.R.C. movement such that the inventive opening/gap moves to that location while preventing concurrently the ability to access all other containers/storage items within the interior of the vehicle device. A non-inventive, as known in the prior art, fails to maintain a precise length of opening/gap at multiple transfer points around the vehicle device WITHOUT exposing additional containers/storage items concurrently therefore not providing 100% validation of no adulteration taking place. The instance at non-secure transfer point 989.1 at a $5^{th}$ location is exemplary of enabling a non-secure transfer of container/storage items such that the non-secure transfer would ideally take place such that the $5^{th}$ location itself is within a secure geofence region (i.e., such as railroad track adjacent to a secure warehouse, or simply within a secure warehouse). The inventive C.R.C. moves along the rail 2025.1.

Scenario B, also a top view, further depicts an instance using a sliding floor 4440 to enable multiple containers/storage items to be rapidly loaded or unloaded without the need for multiple individual movements of the C.R.C. for each individual container/storage item. The ability of the C.R.C. to dynamically change its opening/gap position and the length of the opening/gap provides for such secure transfer. The back 2010 portion of the vehicle device in this instance has an optional movable rail (in this instance that swings open to position 2010.1) such that the rail 2025.1 will not interfere with the sliding floor 4440 movement. In this instance, the sliding floor 4440 is physically above rail 2025.3 such that rail 2025.3 is in structural communication with the sliding floor 4440. Rail 2025.4 is an exemplary instance such that a second sliding floor (not shown) could be implemented as well.

Figure 16:
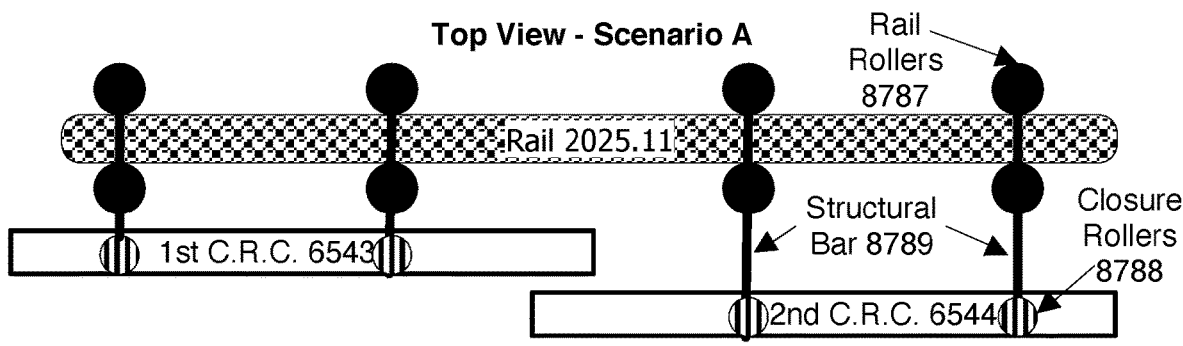
FIG. 16 is a top view of a storage containing device depicting four scenarios of a counter-rotating closure.
Figure 16:
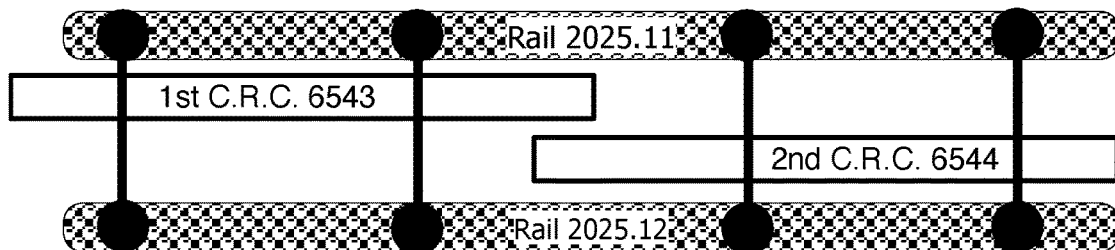
Figure 16:
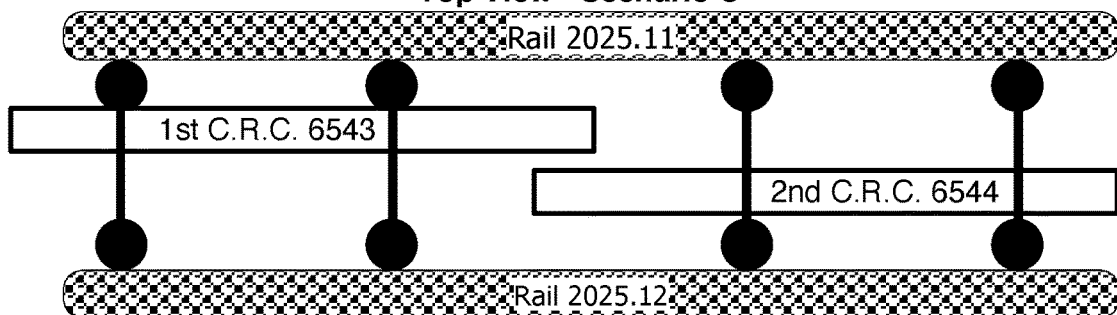
Figure 16:
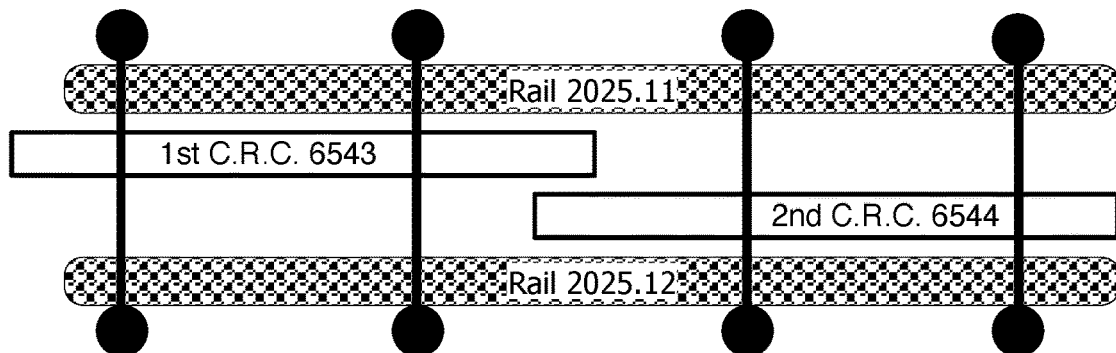
Figure 17:
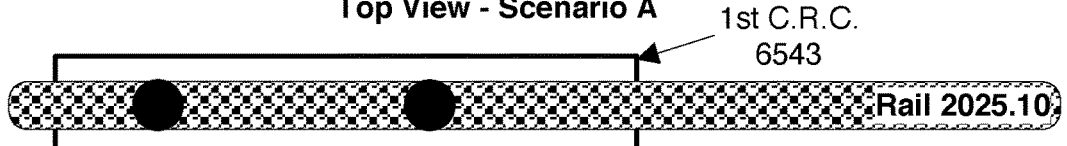
FIG. 17 is depicting two scenarios of top views of a storage containing device having at least two counter-rotating closures, and two scenarios of side views also of a storage containing device having at least two counter-rotating closures.
Figure 17:
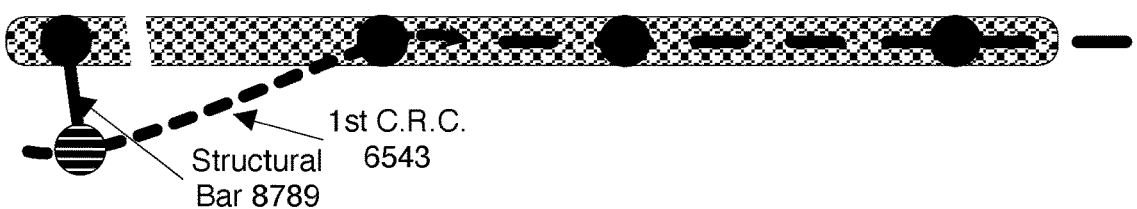
Figure 17:
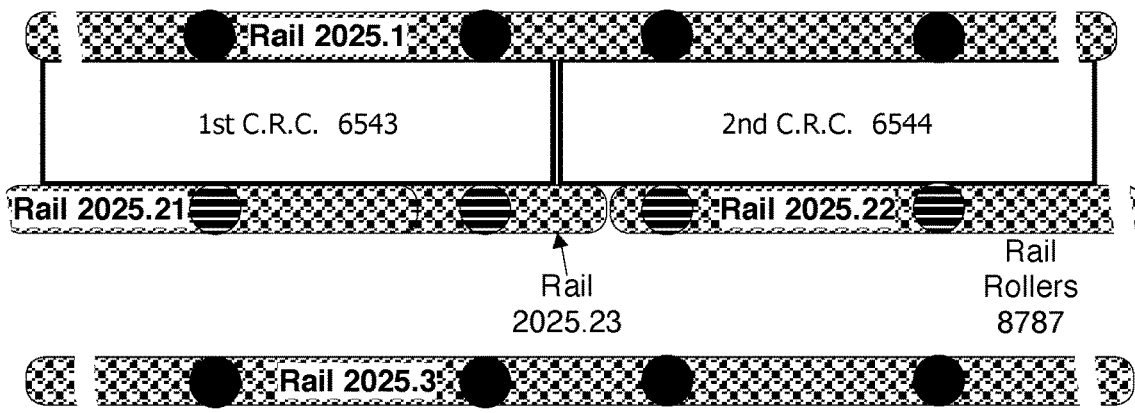
Figure 17:
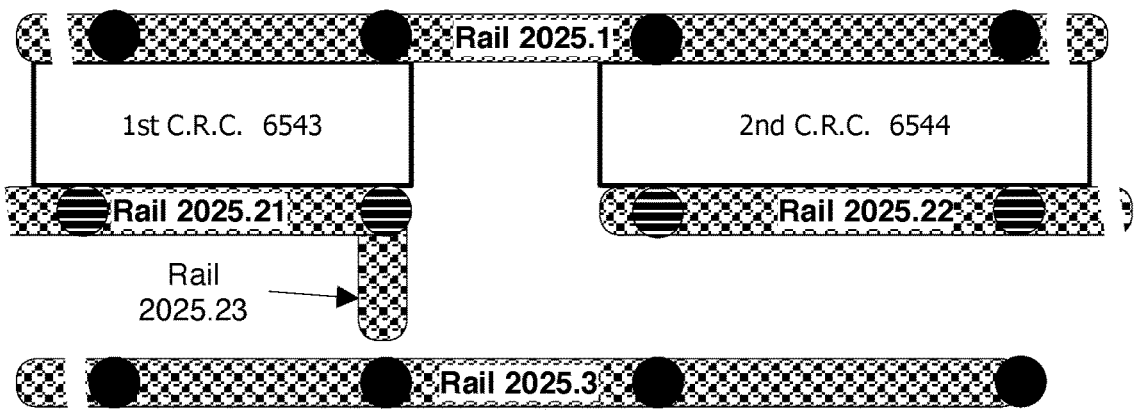

Turning to FIG. 16, FIG. 16 has four distinct scenarios, all having a top view, that depict the various configurations for the rail roller bearings 8787 (all depicted as solid black balls throughout this figure). Scenario A has the C.R.C. can also have roller bearings as depicted being closure roller bearings 8788 (all depicted as a patterned black and white balls throughout the figure). The closure roller bearings 8788 are in structural communications through a roller bearing containment housing (as shown with a further structural bar 8789) to the rail 2025.11 through a second roller bearing containment housing. It is understood that roller bearing containment housing are as known in the art therefore as shown in this figure (as well as all others) to be simply a roller bearing (but in actuality a roller bearing housing). One important embodiment of the invention is such that the opening/gap can also be created by at least two cover closures that are bendable (i.e., such that they flex and bend when moving along a curved portion of rail 2025.11 though only shown in the figure as a straight segment, see FIG. 15 for rail having curved sections) and where a first cover closure 6543 overlaps with a second cover closure 6544 (6544 and 6543 are virtually identical in other respects except for one of the cover closures being further away from the rail than the other at a distance sufficient to provide moving clearance between the two cover closures when at least one of the cover closures moves to create an opening/gap such that the overlap distance is at least 0.1%, preferably at least 1% and preferably at most 50% of the length of an adjoining container/storage items (i.e., the opening/gap can never be wide enough than an adjoining second container/storage item i.e., the adjoining second container/storage item is the one that is NOT desired to be removed from the vehicle device and therefore must be not be able to be physically removed through any excess opening/gap length). Scenario A depicts the first C.R.C. 6543 and the second C.R.C. 6544 in their overlapping position (i.e., with no opening/gap). It is understood that relative movement of either 6543 to the left or 6544 to the right creates the desired opening/gap for transfer of containers/storage items from/to the vehicle device. In this Scenario A, a bearing housing concept such that two bearings are used around a singular rail to provide structural communication between the roller bearing housing and the rail 2025.11 where in this instance both C.R.C. 6543 and C.R.C. 6544 are external facing of the vehicle device and external facing with respect to the rail 2025.11. FIG. 14 and FIG. 17 both depict the roller bearing housing as an integral component of the rail such that bearings travel within (and therefore are constrained) by the rail itself.

Scenario B is an embodiment when the rail is actually comprised of two rail sections being a first rail section 2025.11 and a second rail section 2025.12 such that the rail housing is in structural communications with both the first rail section 2025.11 and the second rail section 2025.12 with each of their respective roller bearings 8787 being integral to their respective rail section. In this instance both the first C.R.C. 6543 and the second C.R.C. 6544 are between the first rail 2025.11 and the second rail 2025.12.

Scenario C also utilizes both a first rail section 2025.11 and a second rail section 2025.12 yet in this embodiment the roller bearing housing is not within each respective rail but rather internal of the two rail components yet still in structural communication from the rail to the roller bearing housing to the roller bearing and then to the C.R.C.

Scenario D is virtually identical to Scenario C except for the roller bearing housing is external of the two rail components.

Turning to FIG. 17, FIG. 17 is another embodiment of the inventive C.R.C. such that in Scenario A at least a first portion of the C.R.C. is able to overlap with a second portion of the C.R.C. It is within the scope of the invention that the first portion of the C.R.C. can be a first C.R.C. 6543 on a first rail 2025.10 and a second portion of the C.R.C. can be a second C.R.C. 6544 is on a second rail 2025.11 (i.e., therefore the C.R.C. is in fact at least two distinct C.R.C. whether the C.R.C.s are compressible or non-compressible, but always bending or flexing such that they can move along a rail that bends by at least 30 degrees, preferably by at least 90 degrees, and particularly preferred by at least 120 degrees).

Scenario B is another top view depicts an exemplary instance the roller bearing housing has a structural bar 8789 such that the $1^{st}$ C.R.C. 6543 can vary its distance from the rail in which it travels. In this instance the C.R.C. must have additional bending or flexing capability and as shown be a compressible C.R.C. (as noted by the discontinuous line representing the C.R.C.).

Scenario C is a side view of one instance of the C.R.C. (i.e., meaning it can be any of the embodiments of the C.R.C. relative to the roller bearing housing and rail itself as long as the C.R.C. is always in structural communications to at least two rails, the first rail 2025.1 and the second rail 2025.21, and at least one roller bearing housing). This instance depicts a first section C.R.C. 6543 with a second section C.R.C. 6544 such that the relative movement of the first section C.R.C. 6543 and the second section C.R.C. 6544 has no opening/gap. In most instances the first rail 2025.1 (as depicted) will be a top rail 2025.1 and the second rail 2025.21 (as depicted) will be a bottom rail 2025.21. The further depiction, and the preferred embodiment, is such that the vehicle device will have multiple levels (and therefore a C.R.C. for each level) therefore a $1^{st}$ C.R.C. 6543 bottom rail 2025.21 becomes the top rail 2025.21 for another level's C.R.C. such as its bottom rail 2025.3. The inventive vehicle device has each level's C.R.C. having independent movement such that the opening/gap as depicted in Scenario D (the distance between the $1^{st}$ C.R.C. 6543 and the $2^{nd}$ C.R.C. 6544) therefore all other containers/storage items on the other levels remains secure (i.e., no opening/gap occurs simultaneously, unless desired by independent movement of the respective C.R.C. for each level). This scenario also depicts a second portion of the rail 2025.23 being rotatable relative to a primary first portion of the rail, though in this instance being shown in its non-rotated position as necessary when the C.R.C. is moved along the rail (such as when the C.R.C. creates an opening/gap or closes the prior opening/gap). The non-solid rollers as depicted by striped balls are indicative of such roller housings that have further flexing, elongating, or bending mechanisms so as to enable the second portion of the rail 2025.23 to bend relative to the primary first portion of the rail.

Scenario D is virtually identical to Scenario C except for clearly depicting the opening/gap between the $1^{st}$ C.R.C. 6543 and the $2^{nd}$ C.R.C. 6544 such that a container/storage item (not shown in this figure) could be removed from or placed onto the same level as the C.R.C. opening/gap level. In this instance the second portion of the rail 2025.23 is rotated away from the primary portion of the first portion of the rail 2025.21 creating an access gap between rail 2025.21 and rail 2025.22. This rotating away requirement is particularly important for the embodiment where each level of rail(s) is capable of moving vertically such that a secondary function of the vehicle device (i.e., transporting passengers or container/storage items that physically demand more than one level). In the transporting of passengers' mode, the movement of the second portion of the rail 2025.23 eliminates the physical movement restriction of passengers when embarking or disembarking the vehicle device. For this instance, the passengers will be standing on (or sitting on seats that are in structural communication with a level becoming the floor 2025.3 (which can be a sliding floor as depicted in another figure).

Figure 18:
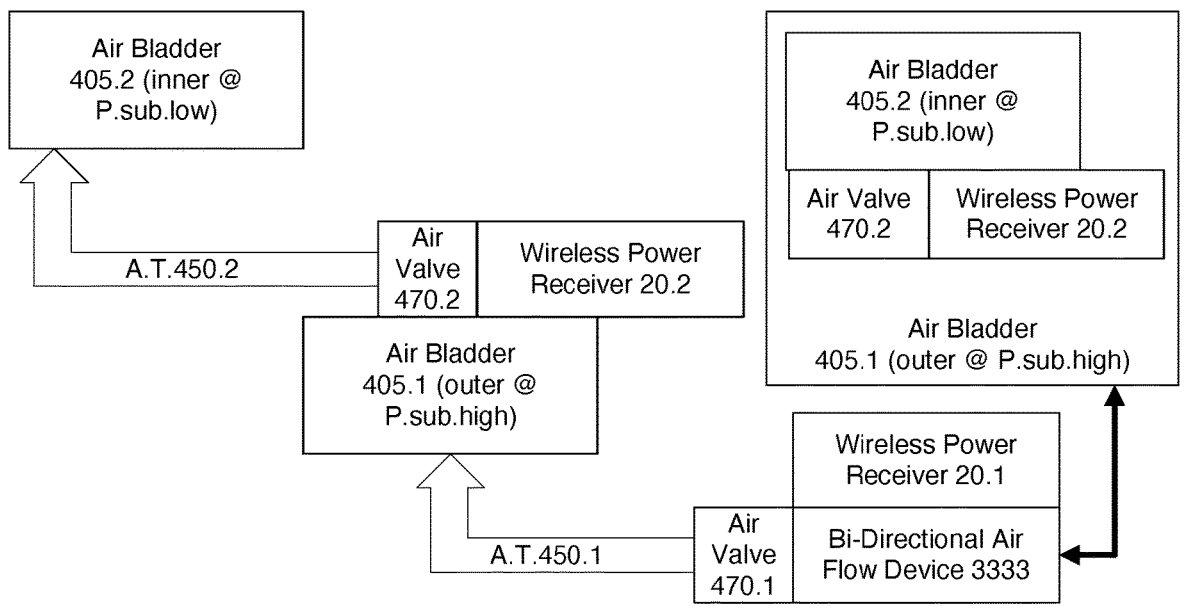
FIG. 18 is a top view of the wireless power system with integral interior air bladder and electrically activated airflow valve control as a reusable packaging system.
Figure 18:
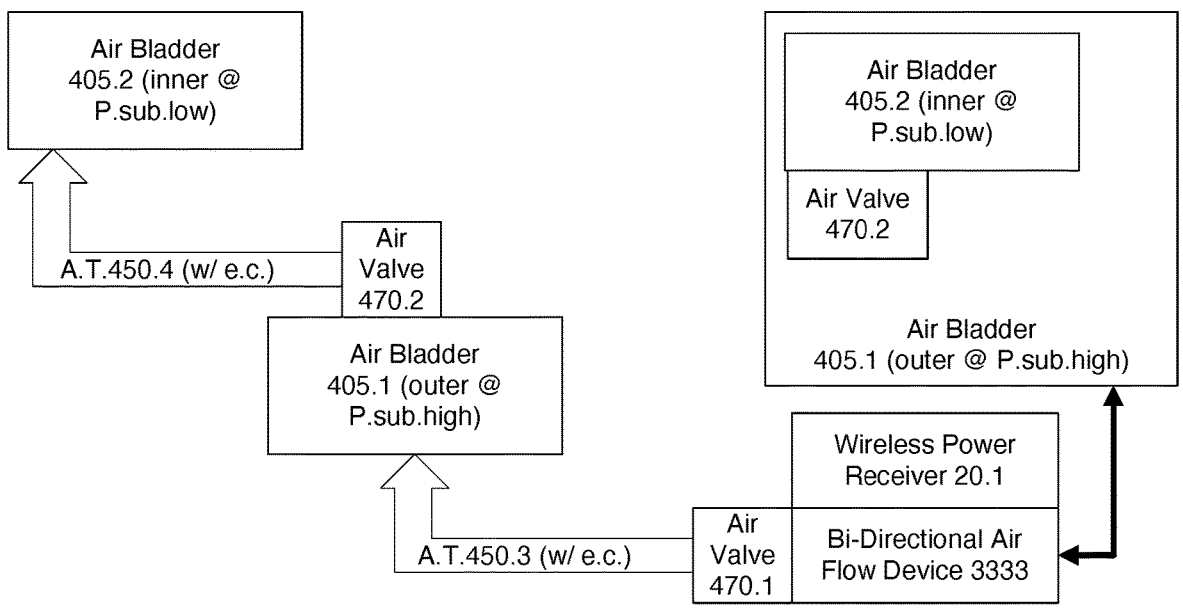

Turning to FIG. 18, FIG. 18 is comprised of two scenarios (A and B). Scenario A is another scenario such that air flow generator (Bi-directional air flow device 3333) is at least internal of the outer layer (not shown) of the outer air bladder 405.1 so as to reduce the ability to easily deflate at least the inner air bladder 405.2, and preferably both the inner 405.2 and outer 405.1 bladders, such that wireless power receiver 20.2 (obtains electricity as shown previously in other Figures from a wireless power transmitter, and it is understood that wireless power can be received to power the air flow generator 3333 as shown with a wireless receiver 20.1, or via hardwired electricity though not shown) is required in order to activate the air flow generator 3333 for air flow into or out of the air bladder 405.2. A key inventive feature is the integration of wireless power receiver inside of the reusable packaging so as to provide the same functionality as typically obtained by air-pillows (e.g., Sealed Air) though with the further advantage of reusability, and even more importantly the ability to achieve a higher level of protection due to the ability of precise control of air volume and air-pressure by at least 5% better than typical air-pillows (and preferably by at least 20% better, meaning at least 20% interior space void where the contained objects being shipped plus the inflated air-bladder is less than 20% of the interior volume of the reusable package, and preferably an interior space void of the interior volume of the reusable package less than 10% and particularly preferred less than 5%). It is understood that the wireless power receiver 20.2, though not shown can further include encrypted transmission of wireless electricity to match the embedded authentication code of microprocessor controlling both the wireless power receiver 20.2 and air valve 470.2 so as to regulate air flow into or out of the air bladder 405.2 in air communication of tubing 450.2. The left-hand side of this scenario depicts an outer air bladder 405.1 in series with an inner (interior) air bladder 405.2 in air flow communications first with an air valve 470.2 and then air tubing 450.2 so as to have two distinct air pressures. The right-hand side of this scenario depicts an outer air bladder 405.1 encapsulating an inner air bladder 405.2 such that the outer air bladder limits movement of the packaged objects within the reusable packaging and the inner air bladder limits the pressure on the packaged objects so as to not break the packaged objects particularly if they are fragile. A fundamental advantage in this scenario is that no battery (energy storage) is required internal of the reusable package, and yet the wireless receiver provides the ability to securely control within a closed reusable package the movement and regulation of air flow in the inner air bladder and outer air bladder and between the inner air bladder and the outer air bladder. It is understood that all electricity consuming devices are in electrical communications with each other (though not shown) within the interior portion of the reusable package as electricity is received via the wireless power receiver 20.2, and preferably as an integral component of the air tubing where the outer bladder is in series with the inner bladder. It is understood that the air flow generator 3333 can have the inner bladder and the outer bladder in parallel configuration instead of series, though more tubing is required and the ability to dynamically vary the higher air pressure of the outer bladder into the inner bladder (whether due to fluctuations in temperature or atmospheric pressure)

Scenario B is virtually identical to Scenario A except that the air flow tubing 450.3 and 450.4 has integral electrical conductivity ("w/ e.c."). This can be achieved as known in the art by utilization of an electrically conductive tube (e.g., metal or conductive polymer) or the tube has an integral electrical wire so as to provide electricity transmission and preferably with air flow communications with an air pressure sensor embedded into the air valve(s) for the filling sequence such that the fill sequence is of the inner bladder first (or concurrently with outer inner bladder) until a low pressure threshold "P.low" is achieved, and then the air valve 470.2 is closed and a continuation of the filling to the outer bladder until a high pressure threshold "P.high" is achieved. Deflating can be in either sequence but preferably the inner bladder first so as to release the enclosed objects (i.e., cargo) quicker.

The preferred embodiment is the inner air bladder with a bi-directional inner valve within the outer air bladder. A further component is a bi-directional outer valve where the inner air bladder and the bi-directional inner valve and the outer air bladder and the bi-directional outer valve are all in air flow communications with an external source of pressurized air at a pressure higher than the outer pressure of the outer bladder, and the inner pressure of the inner bladder is lower than the outer pressure. The valves are preferably of a normally closed type (i.e., in their non-powered condition they will prevent air flow). The alternative Scenario B has the air flow tubing for regulating the flowing air between the inner bladder and the outer bladder with an integral DC electrical circuit (preferably via a conductive ink) so as to provide an electrical source to the valve to switch its position from the closed position to the open position; particularly preferred is that the electrical communications to the valve and embedded sensor takes place within the same conductive ink pathway/circuit. It is an integral function of the outer bladder to provide a second validation point against tampering detection such that access to cargo contained within the inner bladder would require a significant pressure deviation concurrently of the inner bladder pressure and the outer bladder pressure.

Although the invention has been described in detail, regarding certain embodiments detailed herein, other anticipated embodiments can achieve the same results. Variations and modifications of the present invention will be obvious to those skilled in the art and the present invention is intended to cover in the appended claims all such modifications and equivalents.

What is claimed is:

1. A reusable package system comprising: a reusable container comprised of a first container structural element and a second container structural element and a contained cargo, whereby the reusable container is in a tamper resistant configuration when the first container structural element is in structural communications with the second container structural element as the structural communications creates a tamper evident sensor in communications with an embedded microprocessor having a memory device to store a real-time status of the tamper evident sensor, whereby the reusable container is in a container loading or unloading configuration when the second container structural element is not in structural communications with the first container structural element, wherein the reusable container is further comprised of a wireless power receiver in electrical communications with a first electricity source external of the reusable container through an at least one wireless power transmitter at a first location having a real-time peak electricity transmission rate and an onboard energy storage with an onboard stored energy amount and a maximum discharge rate whereby the onboard stored energy amount and the maximum discharge rate of the onboard energy storage exceeds an at least memory writing energy amount to register an at least one tamper evident sensor status change in the memory device by the embedded microprocessor; the reusable container at a second location having a peak electricity consumption rate during an external communication between a wireless communications transceiver at the first location and the reusable container embedded microprocessor having a wireless communications transceiver whereby the reusable container peak electricity consumption rate during external communications between the wireless communications transceiver at the first location and the reusable container wireless transceiver at the second location is greater than the maximum discharge rate of the onboard energy storage and an external communications energy consumption total is greater than the at least memory writing energy amount.

2. The reusable package system according to claim 1 whereby the reusable container is further comprised of an air bladder having an internal air pressure and whereby the air bladder is internal of the reusable container and is filled with an air bladder air and is in structural communications with either the first container structural element or the second container structural element, whereby the tamper evident sensor detects a relative movement between the first container structural element and the second container structural element and wherein the air bladder internal air pressure decreases during the relative movement.

3. The reusable package system according to claim 2 whereby the air bladder with the air bladder air decreases a heat transfer rate between the reusable container contained cargo and an environment external of the reusable container.

4. The reusable package system according to claim 2 whereby the combination of the first element in communications with the second element while the reusable container is being moved from a second location to a third location through a secure logistics vehicle, whereby the internal air pressure of the air bladder changes by at least 0.5 psi in internal pressure indicative of either a shift in position of a contained cargo within the reusable container or an external transportation condition of the secure logistics vehicle, whereby the embedded microprocessor forgoes consumption of the onboard stored energy amount by not registering the at least one tamper evident sensor status change as an energy saving feature and a memory saving feature in the memory device of the embedded microprocessor.

5. The reusable package system according to claim 2 whereby the combination of the first element is not in communications with the second element, whereby the internal air pressure of the air bladder decreases by at least 0.5 psi in internal pressure indicative of either a shift in position of a contained cargo within the reusable container, whereby the embedded microprocessor registers the at least one tamper evident sensor status change into the memory device of the embedded microprocessor.

6. The reusable package system according to claim 1 whereby an aggregate energy consumption amount of the reusable container obtains at least 10% of the energy from the energy storage device and at least 10% of the energy from the wireless power receiver as compared to the reusable container without the wireless power receiver.

7. The reusable package system according to claim 1 whereby the wireless power receiver has a wireless power transmission frequency rate or an embedded wireless power signal on the at least one wireless power transmitter as a function of the first location with an integral authentication key of the first location that matches a previously stored encryption key in the reusable container and wherein the matching of the integral authentication key of the first location with the previously stored encryption key in the reusable container enables the reusable container to register the at least one tamper evident sensor status change in the memory device by the embedded microprocessor within the reusable container.

8. The reusable package system according to claim 7 whereby the presence of the authentication key concurrently with changing the state of the reusable container as required for unloading cargo from the reusable container or placing the reusable container in a secure mode including the resetting of the memory of the tamper evident sensor state.

9. The reusable package system according to claim 1 whereby the wireless power receiver is a photovoltaic cell and whereby the first location has a light source as an energy source for conversion into an electricity source by the wireless power receiver at the second location.

10. The reusable package system according to claim 1 whereby the wireless power receiver has a wireless power transmission frequency rate or an embedded wireless power signal on the at least one wireless power transmitter as a function of the first location with an integral authentication key of the first location that matches a previously stored encryption key in the reusable container and wherein the matching of the integral authentication key of the first location with either the previously stored encryption key in the reusable container or a previously stored encryption key specific to an authenticated cleaning device at an authenticated cleaning location to enable the reusable container to register a reusable container cleaning confirmation status change in the memory device by the embedded microprocessor within the reusable container.

* * * * *